United States Patent [19]

Franke et al.

[11] Patent Number: 4,710,569
[45] Date of Patent: Dec. 1, 1987

[54] BASIC DYESTUFFS

[75] Inventors: Günter Franke, Leichlingen; Dieter Ockelmann, Cologne; Roderich Raue, Leverkusen; Peter Wild, Odenthal, all of Fed. Rep. of Germany

[73] Assignee: Bayer Aktiengesellschaft, Leverkusen, Fed. Rep. of Germany

[21] Appl. No.: 774,273

[22] Filed: Sep. 10, 1985

[30] Foreign Application Priority Data

Sep. 13, 1984 [DE] Fed. Rep. of Germany ....... 3433545

[51] Int. Cl.⁴ ...................... C09B 19/00; C09B 19/02
[52] U.S. Cl. ...................... 544/31; 540/125; 540/127; 544/74; 544/75; 546/101; 546/167; 549/227; 549/394
[58] Field of Search ............. 544/74, 75, 31; 546/101, 167; 540/125, 127

[56] References Cited

U.S. PATENT DOCUMENTS 4,628,086 12/1986 Franke .................. 544/31

Primary Examiner—Richard L. Raymond
Attorney, Agent, or Firm—Sprung Horn Kramer & Woods

[57] ABSTRACT

Dyestuffs of the formula

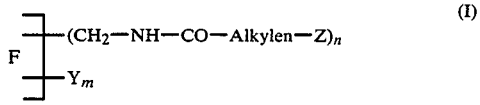

(I)

wherein

F stands for an organic chromophore and
Z stands for radicals of the formulae

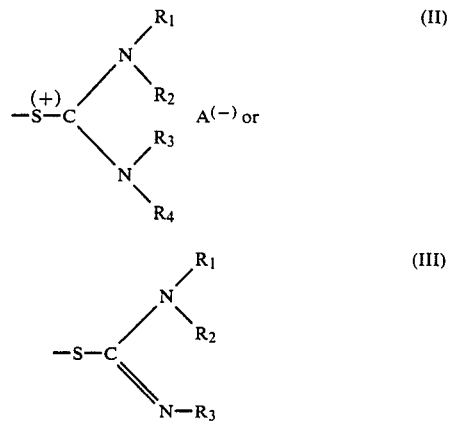

wherein
$R_1$-$R_2$ denote hydrogen, alkyl, cycloalkyl, alkenyl, aryl, aralkyl or a heterocyclic structure or
$R_2$ and $R_3$ represent an optionally substituted amino group or together form a ring or
$R_1$ with $R_2$ and/or $R_3$ with $R_4$ form a ring,
$A^{(-)}$ denotes an anion,
Y denotes an anionic group,
m denotes 0-2 and
n denotes 1-6, and wherein the chromophore and said radicals can carry further substituents, provided that the total number of anionic substituents is smaller than the total number of quaternary and quaternizable amino groups, are used for dyeing cellulose fibers, in particular paper.

4 Claims, No Drawings

BASIC DYESTUFFS

The invention relates to the use of dyestuffs of the formula

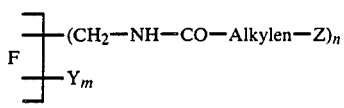
(I)

wherein
F stands for an organic chromophore and
Z stands for radicals of the formulae

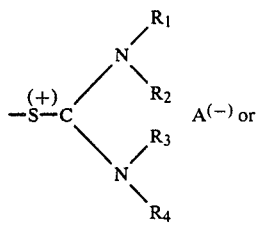
(II)

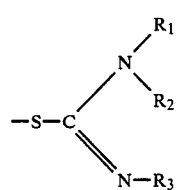
(III)

wherein
$R_1$–$R_2$ denote hydrogen, alkyl, cycloalkyl, alkenyl, aryl, aralkyl, or a heterocyclic structure or
$R_2$ and $R_3$ represent an optionally substituted amino group or together form a ring or
$R_1$ with $R_2$ and/or $R_3$ with $R_4$ form a ring,
$A^{(-)}$ denotes an anion,
Y denotes an anionic group,
m denotes 0–2 and
n denotes 1–6,
and wherein the chromophore and said radicals can carry further substituents, provided that the toal number of anionic substituents is smaller than the total number of quaternary and quaternisable amino grups, are used for dyeing cellulose fibres, in particular paper.

In the formula (I), an organic chromophore is to be understood as meaning in particular chromophores of azine, azo, triarylmethane, xanthene, thioxanthene, phthalocyanine, carbonyl, benzothioxanthene, coumarin, naphtholactam, isoindolenine, formazan, nitro and cyanine dyestuffs.

Azine dyestuffs is to be understood as meaning bisazine and monoazine dyestuffs such as dioxazine, dithiazine, phenothiazine or phenoxazine dyestuffs; carbonyl dyestuffs is to be understood as meaning those such as indigoids, quinophthalones, anthraquinones, quinacridones or carbocyclic and/or heteropolycyclic aromatic compounds having at least two CO groups, of the type also known in the field of vat dyestuffs.

The organic chromophores can be present in metallised form and be substituted. Examples of such substituents are halogen atoms, such as fluorine, chlorine or bromine, and alkyl, alkoxy, aryl, aryloxy, aralkyl, aralkoxy, amino, alkylamino, arylamino, alkylthio, arylthio, hydroxyl, nitro, cyano and thiocyano groups. Alkyl is to be understood as meaning here and hereinafter in particular radicals having 1 to 4 carbon atoms; aryl is to be understood as meaning in particular phenyl, tolyl, chlorophenyl, methoxy, ethoxyphenyl or naphthyl radicals; and aralkyl is in particular the benzyl radical. Particularly important substituents are also the acyl and the acylamino group. The term acyl encompasses in particular radicals of aromatic carboxylic or sulphonic acids, in particular those of the benzene series or alkanoyl or alkylsulphonyl radicals which are low-molecular, and can contain 1 to 4 carbon atoms, such as the acetyl, benzoyl, p-chlorobenzoyl, p-phenylbenzoyl, benzenesulphonyl or p-toluenesulphonyl radical, and also low-molecular alkylcarbonyl radicals and also sulphonamide or carboxamide groups whose nitrogen atom can be substituted by alkyl or aryl radicals, such as the ethoxycarbonyl, carbamoyl or sulphamoyl radical. These radicals are also preferred radicals of the chromophores of the dyestuffs indicated hereinafter.

The anionic group Y represents for example a phosphoric acid group, a carboxyl group or a sulpho group or a salt form such as the Na, K, Li or ammonium salt of this free acid group.

In the formulae (I) to (III), an alkyl radical is to be understood as meaning in particular a radical having 1 to 6 C atoms and an alkylene radical is to be understood as meaning a radical having 1 to 4 C atoms, in particular 1 or 2.

In the formulae (II) and (III), moreover, aryl and aralkyl preferably stand for phenyl or tolyl and benzyl or phenylethyl respectively, cycloalkyl for cyclopentyl and cyclohexyl, and alkenyl for a radical having 2 to 4 C atoms. A heterocyclic structure is preferably to be understood as meaning a 5- or 6-membered, N, O and-/or S-containing ring having one or two hetero atoms.

The substituents are preferably halogen, such as fluorine, chlorine or bromine, $C_1$-$C_4$—alkoxy, OH, SH, CN, SCN, $C_1$-$C_4$—alkoxycarbonyl, carboxamide, sulphonamide or amino, and for the rings also $C_1$-$C_4$—alkyl and nitro.

The rings formed by linking $R_1$ with $R_2$, $R_3$ with $R_4$ or $R_2$ with $R_3$ are preferably 5- or 6-membered and can be condensed with a further ring.

Cations of the group Z of the formula (II) are listed as examples in Table 1.

TABLE 1

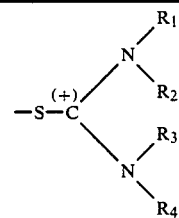

| Lines | $R_1$ | $R_2$ | $R_3$ | $R_4$ |
|---|---|---|---|---|
| 1 | H | H | H | H |
| 2 | H | Alkyl | H | H |
| 3 | H | " | Alkyl | H |
| 4 | Alkyl | " | H | H |
| 5 | " | " | Alkyl | H |
| 6 | " | " | " | Alkyl |
| 7 | H | Allyl | H | H |
| 8 | H | " | Allyl | H |
| 9 | H | Cycloalkyl | H | H |
| 10 | H | Aryl | H | H |
| 11 | H | " | Aryl | H |
| 12 | H | Furfuryl | H | H |
| 13 | H | 2-Thiazoyl | H | H |
| 14 | H | Alkylene | | H |
| 15 | $R_5$ | o-Arylene | | $R_5$ |

TABLE 1-continued

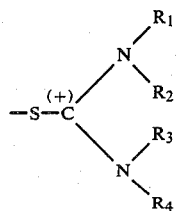

| Lines | $R_1$ | $R_2$ | $R_3$ | $R_4$ |
|---|---|---|---|---|
| 16 | Alkyl | | $-CR_6=CR_7-$ | Alkyl |
| 17 | $R_5$ | | $-CR_6=N-$ | $R_5$ |
| 18 | $R_5$ | | $-CR_6R_7-CO-$ | $R_5$ |
| 19 | H | | $-CH_2-NR_8-CH_2-$ | H |
| 20 | $R_5$ | | $-CO-CR_6R_7-CO-$ | $R_5$ |
| 21 | $R_5$ | | $-CR_6=CR_7-CO-$ | $R_5$ |
| 22 | | Alkylene | $R_6$ | H |
| 23 | | $-(CH_2)_2-O-(CH_2)_2-$ | $R_6$ | H |
| 24 | | $-(CH_2)_2-NR_5-(CH_2)_2-$ | $R_6$ | H |
| 25 | H | $-NR_8R_9$ | $R_5$ | H |
| 26 | H | $-NR_8R_9$ | $-NR_8R_9$ | H | wherein $R_5$ denotes hydrogen or alkyl and $R_6-R_9$ denote hydrogen, alkyl, cycloalkyl, alkenyl, aryl or aralkyl, or $R_6$ and $R_7$ and/or $R_8$ and $R_9$ for a ring.

The preferred denotations for alkyl, cycloalkyl, alkenyl, aryl and aralkyl in Table 1 correspond to the above-mentioned preferred denotations. Preferred alkylene is ethylene and 1,2- and 1,3-propylene. Preferred o-arylene is o-phenylene.

$R_6$ and $R_7$ can jointly form a trimethylene, tetramethylene or pentamethylene bridge, for example for the formation of a 5- or 6-ring. $R_8$ and $R_9$ can form together with the N atom for example a pyrrolidine, piperidine, piperazine or morpholine ring.

The anion $A^{(-)}$ can be any organic and inorganic anion which is customary for cationic dyestuffs. Colourless anions are preferred.

The anion is generally given by the method of preparation and the purification which may have been carried out on the starting materials. However, the anions can also be exchanged in a known manner against other anions. Examples of $A^{(-)}$ are: halides such as chloride, bromide and iodide, sulphate, hydrogensulphate, methylsulphate, ethylsulphate, amidosulphate, perchlorate, phosphate, hydroxide, formate, acetate, propionate, oxalate, malonate, succinate, maleate, chloroacetate, trichloroacetate, methoxyacetate, ethoxyacetate, lactate, citrate, benzoate, methanesulphonate, ethanesulphonate, benzenesulphonate, p-toluenesulphonate, carbonate, tetrachlorozincate and tetrafluoroborate.

Except for the case of $R_1-R_4=H$, the radicals Z which are shown in Table 1 in cationic form II can also be present in the neutral form (III), the mixtures of both forms can be present in one compound of the formula (I).

Of the dyestuffs of the formula (I), dyestuffs which are particularly suitable for dyeing cellulose fibres, in particular paper, have the formula

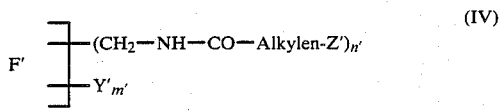

wherein

F' stands for an organic chromophore having at least 4 carbocyclic and/or heterocyclic five- and/or six-rings which can be condensed and be substituted by the radicals mentioned above for chromophores, Z' denotes the radicals

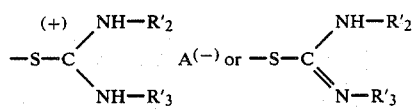

$R'_2$ and $R'_3$ denote hydrogen, $C_1-C_4$—alkyl, $C_2-C_4$—alkenyl, cyclohexyl, phenyl or tolyl or $R'_2$ and $R'_3$ together denote ethylene, trimethylene, vinylene or o-phenylene, $A^{(-)}$ denotes an anion, Y' denotes a sulpho or sulphonate group, m' denotes 0-1 and n' denotes 1-5, and the number of sulpho groups is smaller than the number of quaternary and quaternisable amino groups.

Preferred representatives of the organic chromophores F' are: from the group of polycyclic carbonyl dyestuffs—indanthrone, flavanthrone, anthanthrone, pyranthrone, dibenzopyrenequinone, isodibenzopyrenequinone, violanthrone, isoviolanthrone, benzanthrone and thiophenebenzanthrone dyestuffs, anthrimidecarbazoles, phthaloylacridones and nitrogen-containing derivatives of tetracarboxylic acids of naphthalene, of 1,1'-bis-naphthyl and of perylene, isoviolanthrone, violanthrone and the $C_1$— and $C_2$—alkyl and alkylene ethers of its 16,17-dihydroxy derivative; cis- and trans-naphthoylenebenzimidazole, 5,5'-bis-naphthyl-1,1',8,8'-tetracarboxylic acid dibenzimidazole and its 6'',6'''-dimethyl derivative, N,N'-diarylimides of perylenetetracarboxylic acid in which aryl stands for phenyl, p-tolyl, p-phenomethoxy or p-phenethoxy; 4,4'-dibenzanthronyl and the compounds

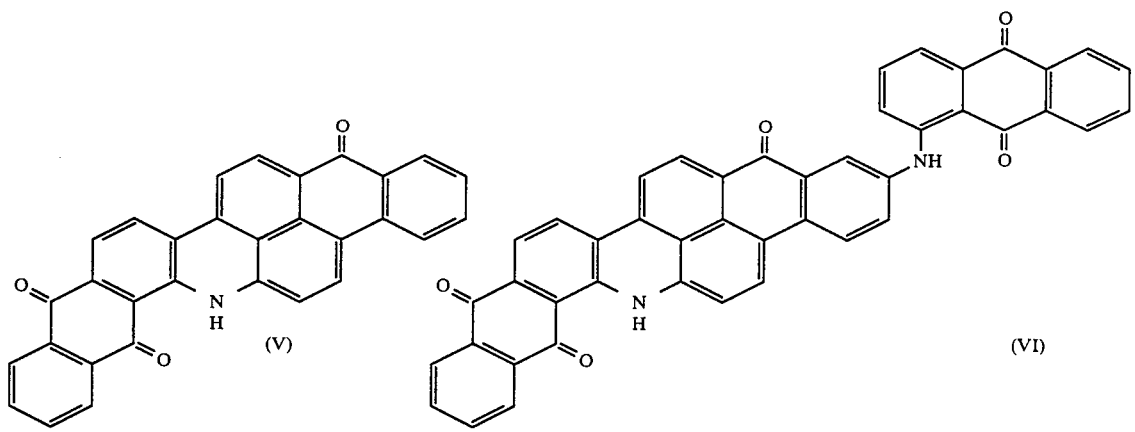

are particularly noteworthy;

of the phthalocyanines—preferably the unsubstituted basic structures with copper or nickel as central atom, of the indigoids—indigo and thioindigo, of the xanthene dyestuffs—those of the formula

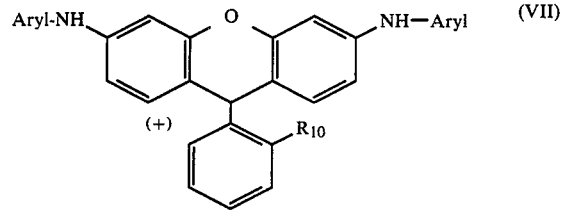

with $R_{10}$=H, Cl, Br, COO$^\ominus$ and SO$_3\ominus$, the positive charge of which may be compensated by an external anion A$^{(-)}$ of the abovementioned denotation;

from the series of azine dyestuffs—dithiazine dyestuffs such as

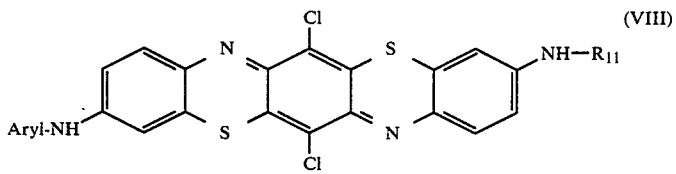

with $R_{11}$=H or aryl, and in particular—dioxazine dyestuffs of the formula (XVII) mentioned hereinafter.

Dyestuffs (VII) and (VIII) can carry formula substituents of the type defined on page 2. The preferred compounds have aryl radicals which stand for phenyl or alkyl- or alkoxy-substituted phenyl, from the group of the quinophthalone dyestuffs—those of the formula

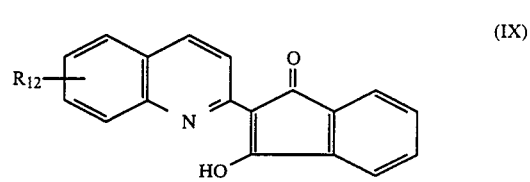

where $R_{12}$ corresponds to a fused-on benzene ring or a radical

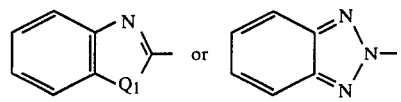

with $Q_1$=NH, N—alkyl, O or S;

of these, there may be mentioned in particular the compounds

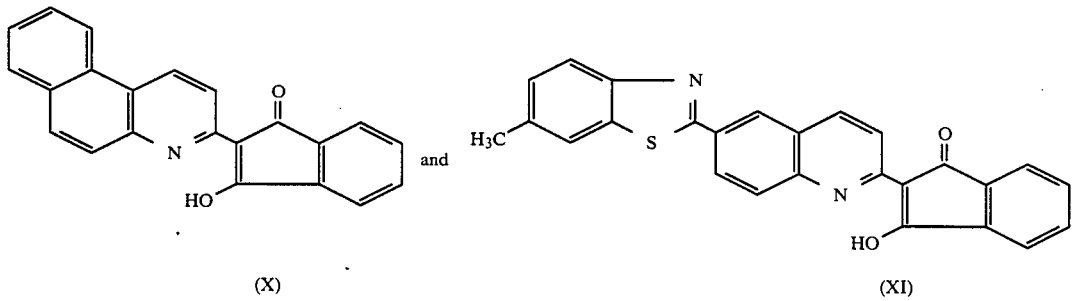

and also those compounds of the formula (IX) in which the benzene ring of their indanedione portion is substituted by aryl, in particular by phenyl;

from the area of the azo dyestuffs—monoazo and bisazo dyestuffs which may be present in metallised form. Of these, there may be mentioned in particular symmetric azo dyestuffs of the formula

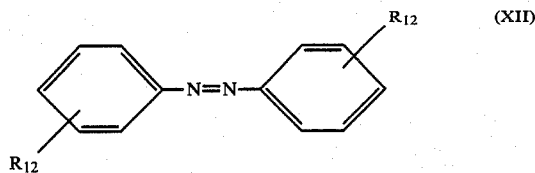 (XII)

where $R_{12}$ has the abovementioned denotation, and especially azo dyestuffs of the formulae (XIX) and (XX) listed hereinafter;

from the group of the triarylmethane dyestuffs—those of the formulae (XXI)–(XXIII) mentioned hereinafter.

In the preferred dyestuffs of the formula (IV), $m' = O$ and
alkylene = methylene or ethylene.

The invention also provides basic dyestuffs of the formula

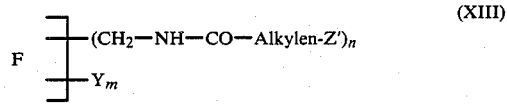 (XIII)

in which
F, Y, m and n have the denotation indicated under the formula (I) and Z' has the denotation indicated under the formula (IV) and
$A^{(-)}$ stands for an anion of the abovementioned denotation.

Of the dyestuffs of the formula (XIII), preference is given to those of the formula

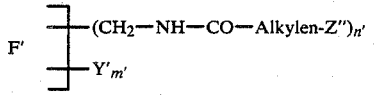 (XIV)

wherein
F', Y', m' and n' have the denotation mentioned under the formula (IV) and
Z'' stands for radicals of the formulae

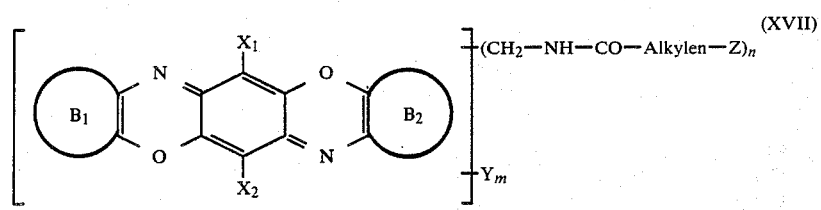

wherein
$R''_2$ and $R''_3$ denote hydrogen or $C_2-C_3$—alkylene, preferably ethylene.

In the particularly preferred dyestuffs of the formula (XIV),
$m' = O$ and
alkylene = methylene or ethylene.

The invention further provides basic dioxazine dyestuffs of the formula

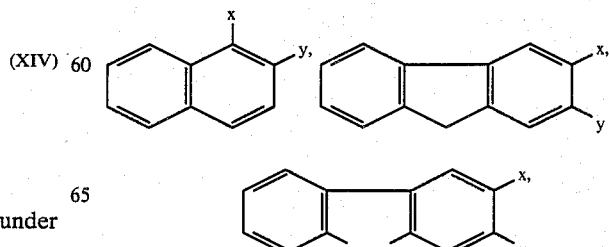 (XVII)

wherein
$X_1$ and $X_2$ independently of each other denote hydrogen, halogen, alkyl, cycloalkyl, aryl, alkoxy, aryloxy, CN, $CONH_2$, CONH—alkyl, CON(alkyl)$_2$, CONH—aryl, COO—alkyl, NH—CO—alkyl, NH—aryl, NH—CO—aryl or NH—CO—heteroaryl and
$B_1$ and $B_2$ independently of each other denote a benzene ring or a fused-on ring system having 2 to 4 carbocyclic and/or heterocyclic rings, and
Y, Z, m and n have the denotation indicated under the formula (I),
and the cyclic and acyclic radicals and the rings $B_1$ and $B_2$ can carry further substituents, with the proviso that the total number of anionic substituents is smaller than the total number of quaternary and quaternisable amino groups.

The dyestuffs (XVII) dye paper in bright red to blue shades.

The ring systems $B_1$ and $B_2$ preferably consist of aromatic 5- and 6-membered rings which are condensed from benzene rings and which can contain heteroatoms such as O, N or S. There may be mentioned as examples (the position x indicates the bond to the oxygen and position y the bond to the nitrogen):

-continued

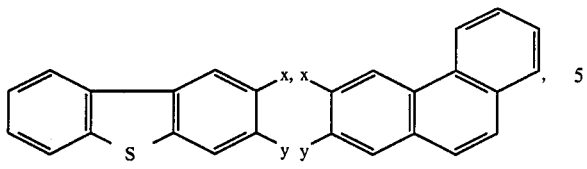

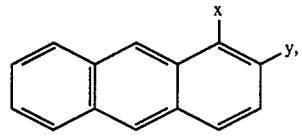

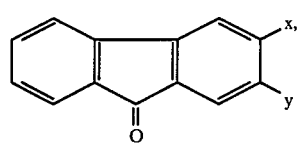

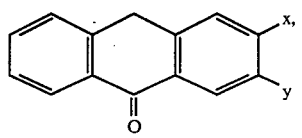

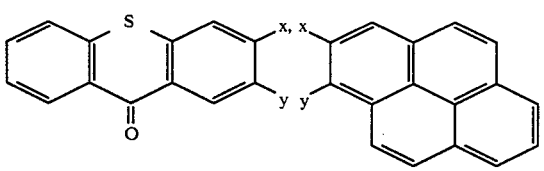

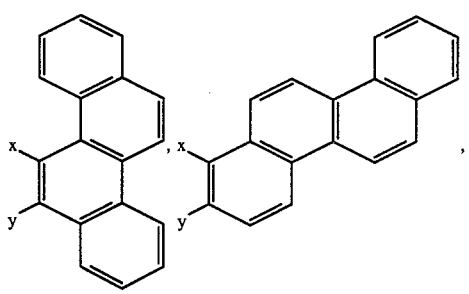

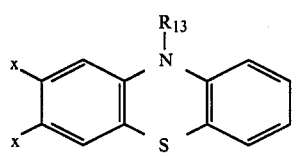

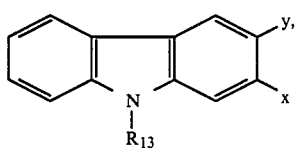

-continued

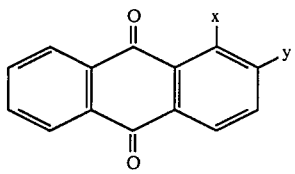

where $R_{13}$=hydrogen, $C_1$-$C_4$—alkyl, $C_1$-$C_4$—alkylcarbonyl, $C_1$-$C_4$—alkylsulphonyl, benzoyl, phenyl or benzyl.

These ring systems, in addition to the substituents defined in the formula (I) can carry further radicals, in particular the substituents referred to above as preferred.

Of the dioxazine dyestuffs of the formula (XVII) preference is given to those of the formula

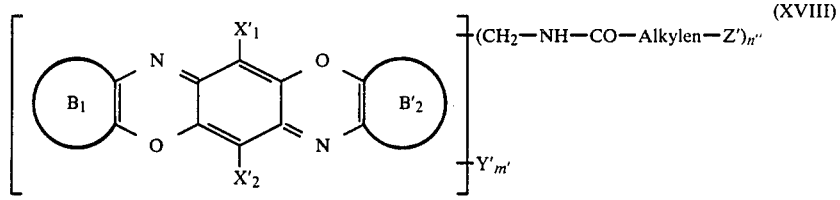

(XVIII)

wherein $X'_1$ and $X'_2$ independently of each other denote hydrogen or halogen, $B'_1$ and $B'_2$ independently of each other denote a group from the series benzene, naphthalene, fluorene, phenothiazine, diphenylene sulphide, phenanthrene, anthracene, fluorenone, carbazole or anthraquinone and n" denotes 2-5 and Y', Z' and m' have the denotation indicated under the formula (IV).

In the preferred dyestuffs of the formula (XVIII), $B'_1$ and $B'_2$ on the one hand and $X'_1$ and $X'_2$ on the other are identical.

Of these dioxazines, there may be singled out in turn those where $X'_1 = X'_2$ = chlorine, m' = 0 and alkylene = methylene or ethylene.

Of these dyestuffs, a very particular mention should go to those with $B'_1 = B'_2$ = o-phenylene which can be monosubstituted or disubstituted by Cl, aryl, benzyl, alkoxy, aryloxy, NH—CO—alkyl and NH—CO—aryl, where alkyl and aryl preferably have the previously highlighted denotations, and to those with $B'_1 = B'_2 =$ 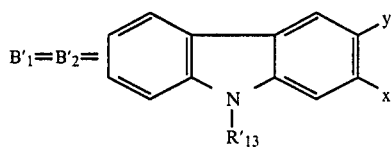

where $R'_{13}$ stands for hydrogen, $C_1$-$C_4$—alkyl, in particular ethyl, $C_1$-$C_4$—alkylcarbonyl, $C_1$-$C_4$—alkylsulphonyl or benzyl.

The invention also provides basic azo dyestuffs of the formula

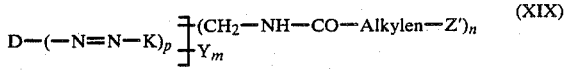 (XIX)

wherein
D denotes the radical of a diazo component,
K denotes the radical of a coupling component and
p denotes 1 or 2 and
Y, m and n have the denotation indicated under the formula (I) and
Z' has the denotation indicated under the formula (IV) and
the diazo and coupling components can carry further substituents with the proviso that the total number of anionic substituents is smaller than the total number of quaternary and quaternisable amino groups.

In the formula (XIX), in particular
D stands for radicals of diazo components from the series benzene, naphthalene, thiazole, benzothiazole, benzisothiazole, thiadiazole, benzotriazole, fluorene, carbazole, dibenzofuran and dibenzothiophene and
K stands for the radical of a coupling component from the series benzene, naphthalene, pyrazole, pyridine, quinoline and pyrimidine and for the radicals of acylacetic acid or malonic acid derivatives.

The dyestuffs (XIX) dye paper in bright yellow to violet shades.

Of the azo dyestuffs of the formula (XIX), preference is given to those of the formula

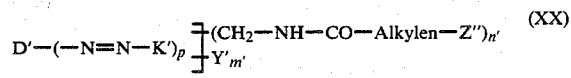 (XX)

wherein
D' denotes a radical of the formulae

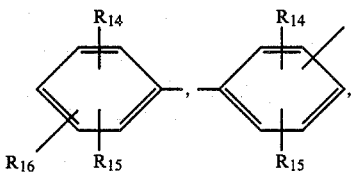

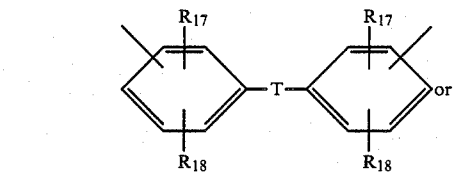

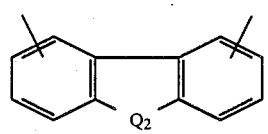

wherein
$R_{14}$ and $R_{15}$ independently of each other stand for hydrogen, alkyl, alkoxy, fluorine, chlorine, bromine or NH—Ac,
Ac stands for alkyl-carbonyl, -sulphonyl or -carbamyl, benzoyl, toluoyl, phenyl- or tolyl-sulphonyl or -carbamyl or optionally substituted triazinyl, $R_{16}$ stands for hydrogen, alkyl, alkoxy, chlorine, bromine, NH—Ac or a radical of the formulae

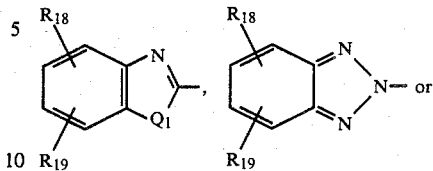

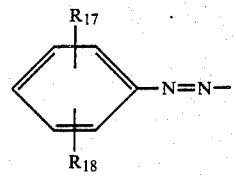

$R_{17}$, $R_{18}$ and $R_{19}$ independently of one another stand for hydrogen, alkyl, alkoxy, chlorine or bromine,
$R_{19}$ additionally stands for a free valency,
$Q_1$ stands as mentioned above for NH, N—alkyl, O or S,
$Q_2$ stands for $CH_2$, $R'_{13}N$, O or S,
$R'_{13}$ as mentioned above stands for hydrogen, alkyl, alkyl-carbonyl or -sulphonyl or benzoyl,
T stands for a direct bond or bridge member,
K stands for a radical of the formulae

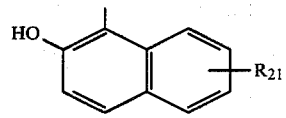

with
$R_{21}$=H, halogen such as chlorine or bromine, OH, alkyl, alkoxy, alkylamino, phenylamino, acylamino, $SO_2NH_2$, $SO_2NH$—alkyl, $SO_2N(alkyl)_2$;

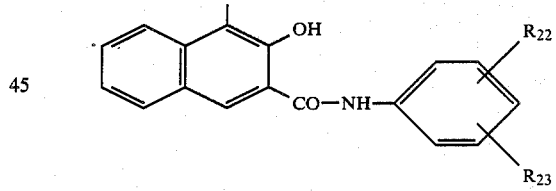

with
$R_{22}$=H, halogen such as chlorine or bromine, alkyl, alkoxy, phenoxy, acylamino, $SO_2NH_2$, $SO_2$—NH—alkyl, $SO_2N(alkyl)_2$, $NO_2$, CN and $R_{23}$=H, halogen such as chlorine or bromine, alkyl, alkoxy;

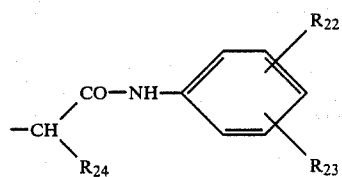

with
$R_{22}$ and $R_{23}$ in the abovementioned denotation and
$R_{24}$=$COCH_3$, CO—phenyl, COO—alkyl, $CONH_2$ or CN;

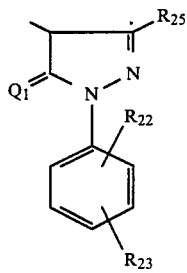

with
$R_{25}$=CH$_3$, COOCH$_3$, COOC$_2$H$_5$ and
$Q_1$, $R_{22}$ and $R_{25}$ in forenamed denotation;

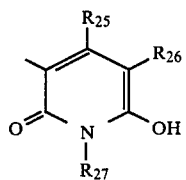

with
$R_{26}$=H, halogen such as chlorine or bromine, COO—alkyl, CONH$_2$, CN,
$R_{27}$=H, alkyl, phenyl, benzyl or NH—C$_2$—C$_4$—alkylene—G,
wherein
G denotes dialkylamino, 1-piperidino, 1-morpholino, 1-piperazino, 1-pyrrolidino, hydroxyl or C$_1$-C$_4$—alkoxy,

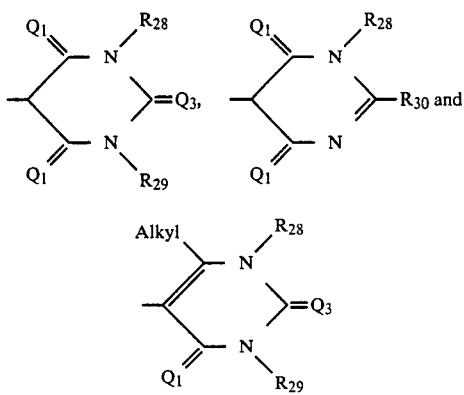

with
$Q_1$=independently of each other the abovementioned denotation,
$Q_3$=O, S, NH, N—CN, N—phenyl,
$R_{28'}$, $R_{29}$=H, alkyl, phenylene—$R_{21}$,
$R_{30}$=H, alkyl, phenylene—$R_{21}$, alkylamino or dialkylamino,
Y′, m′ and n′ have the denotation mentioned under the formula (IV),
Z″ has the denotation mentioned under the formula (XIV) and
p has the denotation mentioned under the formula (XIX).

Preferred bridge members are: C$_1$-C$_4$—alkylene, CH=CH—, —O—, —S—, >SO$_2$, —NH—, >N—alkyl, —NH—NH—, —N=N—, >C=O, —CO—CO—, —NH—CO—, —O—CO—, —NH—SO$_2$—, —O—SO$_2$—, —CO—NH—phenylene—NH—CO—, —S—S—,

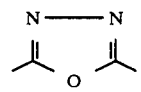

isopropylidene, cyclohexylidene, —O—T$_1$—O— with
T$_1$=>C=O, C$_2$-C$_6$—alkylene,

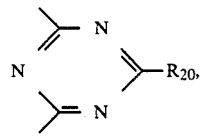

wherein
$R_{20}$ stands, for example, for F, Cl, NH$_2$, alkyl, alkoxy, phenyl or a group NH—C$_2$—C$_4$—alkylene—G
in which
G denotes dialkylamino, 1-piperidino, 1-morpholino, 1-piperazino, 1-pyrrolidino, hydroxyl or C$_1$-C$_4$—alkoxy,

—NH—T$_2$—NH— wherein
T$_2$ stands for T$_1$ and in addition for >C=S, —CO—CH$_2$—CH$_2$—CO—, —CO—CH=CH—CO—, or —CO—phenylene—CO—.

Of the dyestuffs of the formula (XX), preference is given to those in which
m′=O
alkylene=methylene or ethylene and in the azo chromophore of which, namely in D′—(—N=N—K′)$_p$, alkyl stands for C$_1$-CH$_4$—alkyl, preferably methyl or ethyl, and alkoxy stands for C$_1$-C$_4$—alkoxy.

The invention also provides basic triarylmethane dyestuffs of the formula

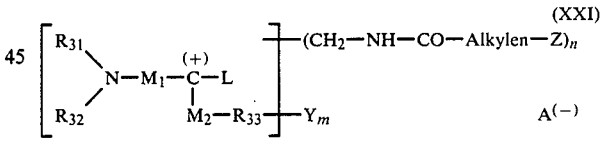

(XXI)

in which
M$_1$ denotes p-phenylene optionally substituted by alkyl or halogen,
M$_2$ denotes p-phenylene optionally substituted by alkyl, alkoxy or halogen,
R$_{31}$ denotes H, alkyl, cycloalkyl, aryl, heteroaryl or aralkyl and
R$_{32}$ denotes H, alkyl or aralkyl and
R$_{31}$ and R$_{32}$, possibly with inclusion of a further heteroatom from the group O, S, NH and N—alkyl, can be cyclised to form a saturated ring or the radical R$_{32}$ can be cyclised with the o-position C atom of M$_1$ to form a partially saturated, heterocyclic ring,
R$_{33}$ denotes H, halogen, alkyl, alkoxy or NR$_{31}$R$_{32}$,
L denotes an aromatic radical of the following denotation: p-phenylene-R$_{34}$, optionally substituted by alkyl or halogen,
1,4-naphthylene-R$_{34}$ optionally substituted by alkyl or halogen with $R_{34}$=H, alkyl, alkoxy, aryloxy or $NR_{31}R_{32}$,

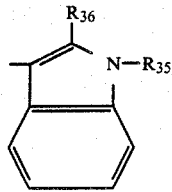

with
$R_{35}$=H, alkyl,
$R_{36}$=H, alkyl, phenyl which is optionally substituted by alkyl, alkoxy or halogen, COOalkyl, $COONH_2$
$A^{(-)}$ denotes an anion in case the charge of the chromophore is not compensated by the radical Y, and
Y, Z, m and n have the denotation indicated under the formula (I).

They dye paper in bright red, violet, blue and green shades.

In the formula (XXI), preferably alkyl stands for $C_1$-$CH_4$—alkyl optionally substituted by hydroxyl, acyloxy, $C_1$-$C_4$—alkoxy, halogen or CN, aryl stands for phenyl or naphthyl optionally substituted by the radicals mentioned in the case of the formulae (II) and (III), heteroaryl stands for an aromatic radical having a five- or six-membered heterocyclic structure which can contain N, O and/or S as heteroatoms, and halogen stands for chlorine and bromine.

Of the triarylmethane dyestuffs of the formula (XXI), preference is given to those of the formula

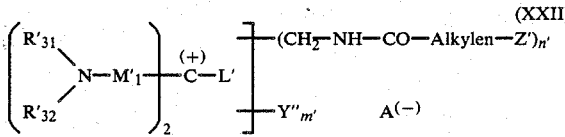
(XXII)

in which
$M'_1$ denotes p-phenylene optionally monosubstituted by alkyl, alkoxy or halogen,
$R'_{31}$ denotes benzyl or aryl,
$R'_{32}$ denotes H, methyl, ethyl or benzyl,
L' denotes an aromatic radical of the following denotation:
p-phenylene—$R'_{34}$ optionally monosubstituted by $C_1$-$C_4$—alkyl or halogen,
1,4—naphthylene—$R'_{34}$ with $R'_{34}$=H, alkyl, alkoxy or $NR'_{31}R'_{32}$,

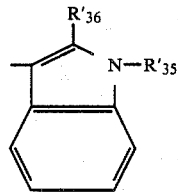

with $R'_{35}$=H or methyl and with $R'_{36}$=methyl or phenyl
Y" denotes a sulpho, sulphonate, carboxyl or carbonate group and
Z, m, and n' denote what was indicated under the formula (IV).

In the preferred dyestuffs of the formula (XXII), alkylene stands for methylene or ethylene, aryl stands for phenyl optionally substituted by halogen, $C_1$-$C_4$—alkyl, $C_1$-$C_4$—alkoxy, phenoxy or tolyloxy, for naphthyl or

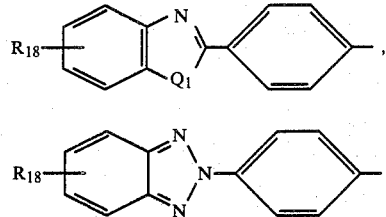

with
$R_{18}$ as mentioned above H, $C_1$-$C_4$—alkyl, $C_1$-$C_4$—alkoxy, chlorine or bromine and
$Q_1$ as mentioned above NH, N—alkyl, O or S.
Of the dyestuffs of the formula (XXII) particular preference is given to those of the formula

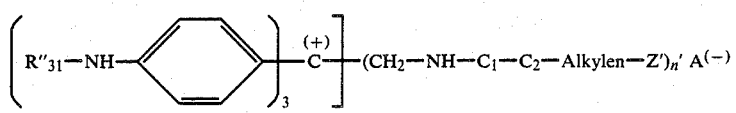
(XXIII)

with
$R''_{31}$=aryl
aryl having in particular the denotations referred to above as preferred.

Preferred dyestuffs are likewise basic phthalocyanine dyestuffs of the formula

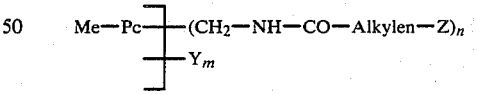
(XXIV)

wherein
Pc denotes a radical of a phthalocyanine dyestuff and
Me denotes Cu or Ni,
Y, Z, m and n have the denotation indicated under the formula (I) and preferably the denotation of Y', Z', m' and n' indicated under the formula (IV), and
m is smaller than n.

The preparation of dyestuffs (I), (XIII), (XVII), (XIX), (XXI) and (XXIV) is effected for example by reaction of corresponding chromophores having the radical —$CH_2$—NH—CO—Alkylen—Halogen (XXV)

with a thiourea of the formula

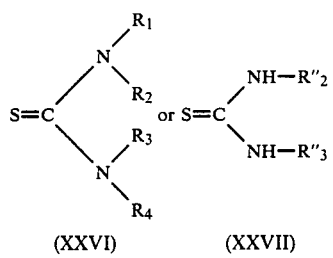

Compounds having the radical (XXV) are common knowledge. They are prepared by reacting the dyestuff basic structure in concentrated sulphuric, phosphoric or polyphosphoric acid either (a) with an N-methylolamide of the formula HO—CH$_2$—NH—CO—Alkylen—Halogen     (XXVIII)

preferably N-methylolchloroacetamide, or (b) with a mixture of paraformaldehyde and an amide of the formula NH$_2$—CO—Alkylen—Halogen     (XXIX)

preferably chloroacetamide or -bromopropionamide.

It is also possible first to react starting materials for the dyestuffs—for example in the case of azodyestuffs diazo or coupling components—with compounds (XXVIII) or (XxLx). Completed dyestuff synthesis is then followed by reaction with the thioureas (XXVI) or (XXVII).

When completed, the reaction solutions of the dyestuffs can be used directly for dyeing, or the dyestuffs are separated off by precipitating, salting out or neutralising or basifying the solution and are dried.

Dyestuffs (I), (XIII), (XVII), (XIX), (XXI) and (XXIV) can find utility as readily water-soluble compounds from aqueous acid solution for dyeing a very wide variety of substrates which are dyeable with cationic dyestuffs, such as cellulose materials, polyacrylonitrile, acid-modified nylon and polyester, wool and leather.

The dyestuffs are highly suitable in particular for dyeing a very wide variety of papers in bright shades.

The degrees of exhaustion obtained in dyeing are high, as evidenced by the small amount of dyestuff in the waste water. The dyeings have good to very good light- and wetfast properties. They are very resistant to the action of water, alcohols, soaps or aqueous organic acids.

EXAMPLE 1

(a) 236 g of the compound

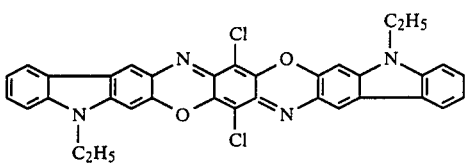

and 200 g of N-methylolchloroacetamide are added at 0°-5° C. as a mixture to 1.1 liters of 90% strength sulphuric acid, which is followed by stirring at this temperature for 15 hours. The reaction solution is discharged onto ice, and the solids are filtered off with suction, washed with water until neutral and dried. This gives 394 g of the compound

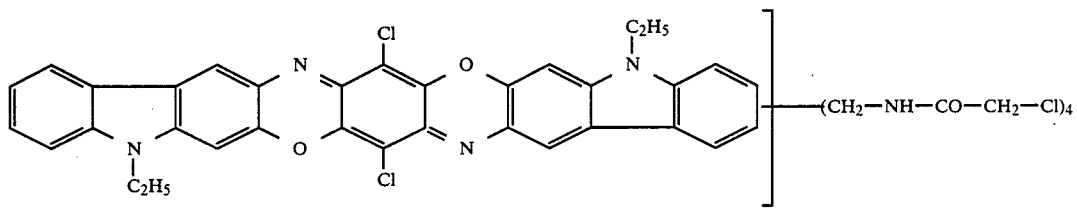

(b) 50 g of this compound in a boiling mixture of 500 ml of water and 65 g of glacial acetic acid are made to react with 30 g of thiourea for 1 hour. This gives a deep blue solution containing about 10% of the compound

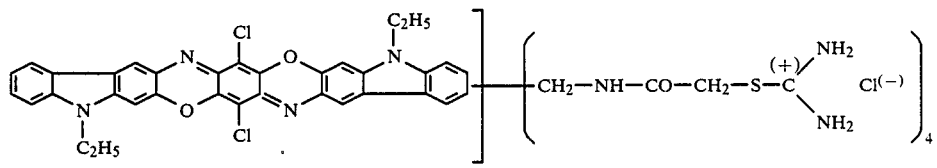

After cooling down, the solution can be discharged directly onto paper. Combined with very good exhaustion properties the result obtained is blue dyeings with very good lightfastness and excellent wetfastness properties. $\lambda_{max}$ 584 nm in methanol. IR (KBr): 1630, 1545, 1335, 1110 cm$^{-1}$.

In place of the acetic acid specified it is also possible to use to the same effect other acids, of which may be mentioned here for example formic acid, lactic acid and methanesulphonic acid.

If 50 g of the compound of Example 1a are reacted with thioureas of the general formula (XXIV), the result obtained analogously to Example 1b is solutions of the corresponding isothiuronium salts of the general formula

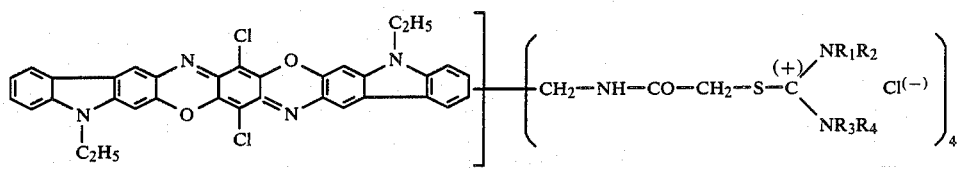

of which examples are listed in Table 1 together with the amount of the associated thiourea to be used.

TABLE 1

| Example | Amount of the corresponding thiourea in g | $R_1$ | $R_2$ | $R_3$ | $R_4$ | $\lambda_{max}$ [nm] in Methanol |
|---|---|---|---|---|---|---|
| 2 | 36 | H | $CH_3$ | H | H | 585 |
| 3 | 41 | H | $CH_3$ | $CH_3$ | H | 587 |
| 4 | 74 | H | n-$C_4H_9$ | n-$C_4H_9$ | H | 582 |
| 5 | 45 | H | Allyl | H | H | 585 |
| 6 | 60 | H | Phenyl | H | H | 585 |
| 7 | 40 | H | —$CH_2$—$CH_2$— | H | 587 |
| 8 | 45 | H | —$CH_2$—$CH_2$—$CH_2$ | H | 584 |

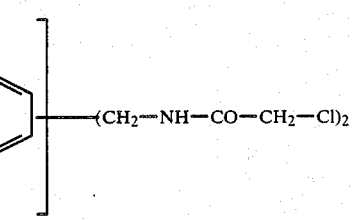

The solutions of the abovementioned compounds can be used to obtain dyeings which in hue and fastness properties correspond to those of Example 1b.

EXAMPLE 9

(a) If 236 g of the compound

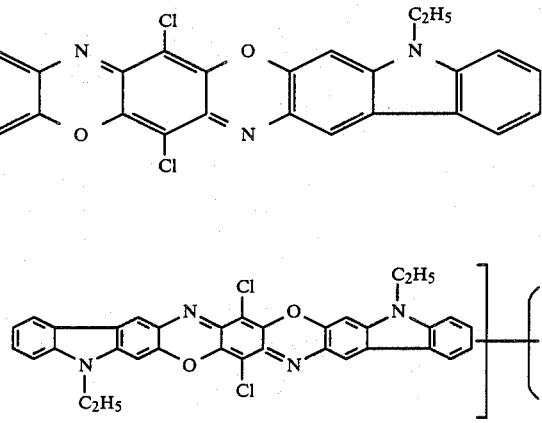

and 100 g of N-methylolchloroacetamide are added at 0°–5° C. in the form of a mixture to 1.1 liters of sulphuric acid and the procedure followed is otherwise as in Example 1a, the result obtained is 315 g of the compound

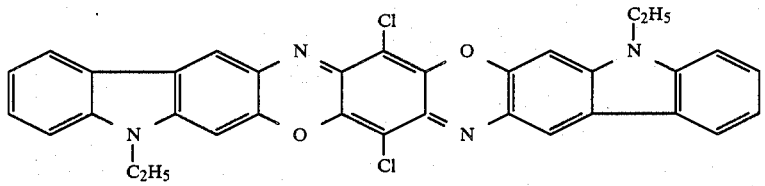

(b) 78 g of this compound in a boiling mixture of 800 ml of water and 23 g of methanesulphonic acid are reacted with 20 g of thiourea for one hour. The result obtained is a deep blue solution containing about 10% of the compound

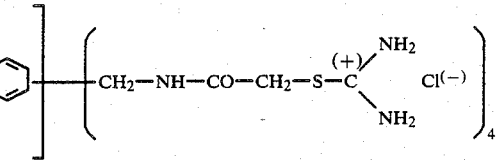

After cooling down, the solution can be dyed up directly onto paper. Combined with very good exhaustion properties the result obtained is violet dyeings having very good lightfastness and excellent wetfastness properties. $\lambda_{max}$ in methanol 586 nm.

If 78 g of the compound of Example 9a are made to react with the thioureas of the formula (XXV) which are indicated in Table 1 in amount and substitution pattern, the result obtained in an analogous manner is the corresponding compounds of the general formula

EXAMPLE 10

(a) 236 g of the compound

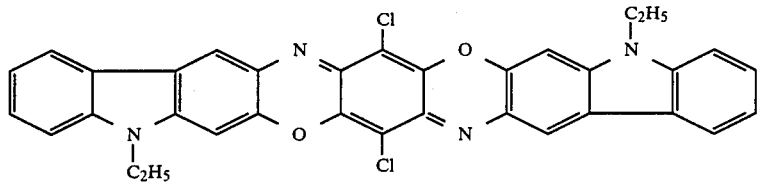

and 150 g of N-methylolchloroacetamide are added at 0°–5° C. in the form of a mixture to 1.1 liters of 90% strength sulphuric acid, which is followed by stirring at this temperature for 15 hours. The reaction solution is discharged onto ice, the solids are filtered off with suction, washed with water until neutral and dried. The result obtained is 394 g of the compound

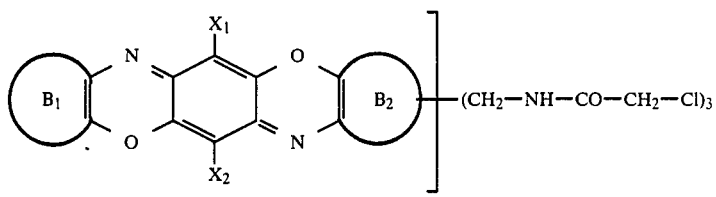

(b) 100 g of this compound are made to react in a boiling mixture of 980 ml of water and 120 ml of glacial acetic acid with 50 g of thiourea for 1 hour. The result obtained is a deep blue solution containing about 10% of the compound

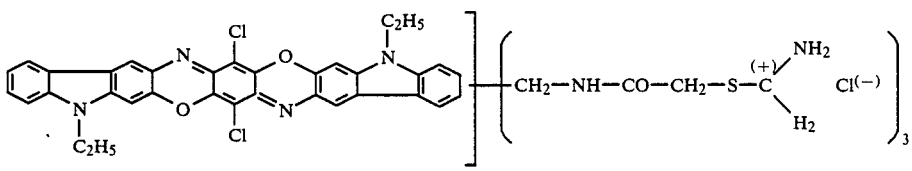

They show the same spectrum of properties as the abovementioned compound.

After cooling down, the solution can be dyed up directly onto paper. Combined with very good exhaustion properties the result obtained is bluish-violet dyeings having very good lightfastness and excellent wetfastness properties. $\lambda_{max}$ in methanol 586 nm: IR (KBr): 1635, 1545, 1335, 1115 cm$^{-1}$.

If the dioxazines listed in Table 2 below are reacted in the amounts indicated there in place of the dioxazine mentioned in Example 10a with 150 g of N-methylolchloroacetamide as described in this example, the result obtained is compounds of the general formula

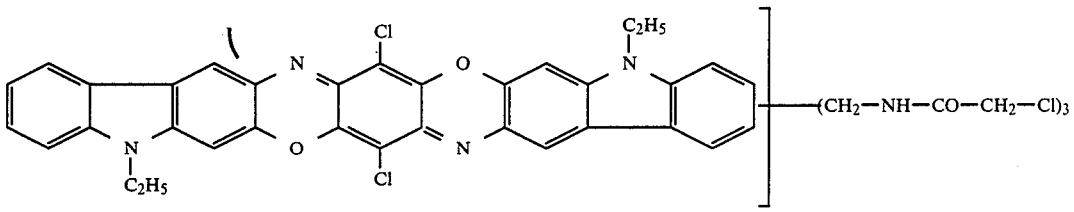

If 100 g of compounds of this type are reacted in each case with the tabulated amounts of thiourea in accordance with the process described in Example 10b, the result obtained is approximately 10% strength solutions of dyestuffs of the general formula:

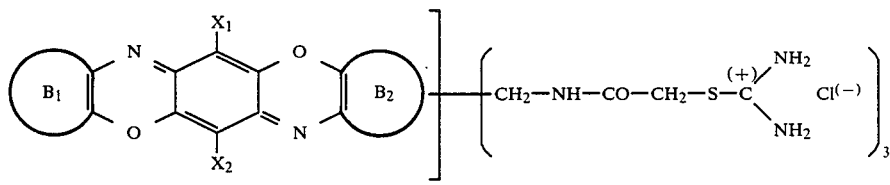

The hues on paper for these substances are listed in Table 2.

TABLE 2
| Example | Structure | Amount used in g Dioxazine | Thiourea | Hue on paper |
|---|---|---|---|---|
| 11 | 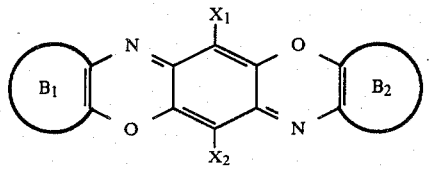 | 258 | 47 | bluish violet |
| 12 | 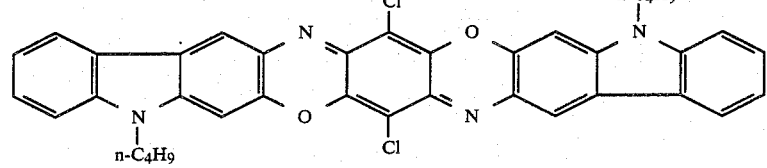 | 208 | 54 | violet |
| 13 | 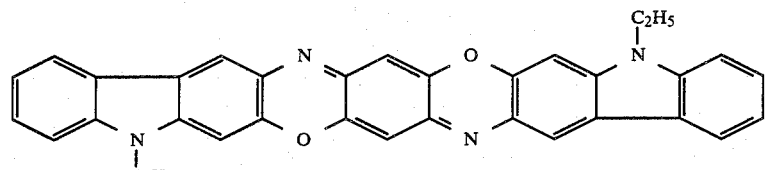 | 247 | 50 | reddish violet |
| 14 | 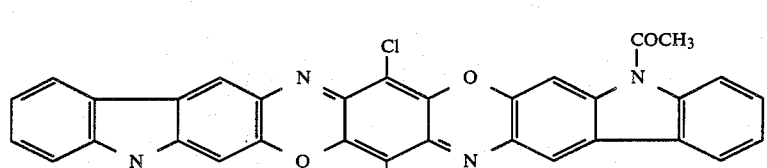 | 185 | 58 | reddish violet |
| 15 | 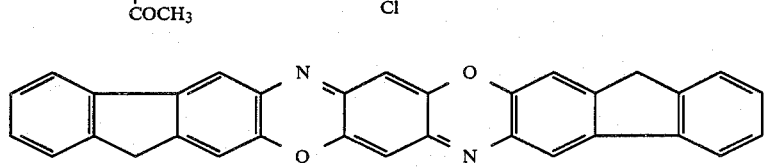 | 224 | 52 | reddish violet |
| 16 | 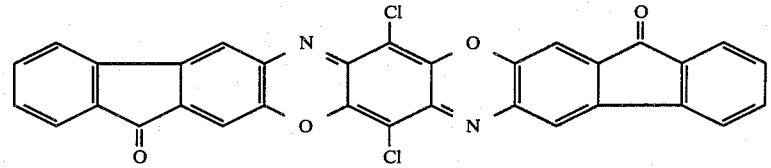 | 262 | 47 | reddish blue |
| 17 | 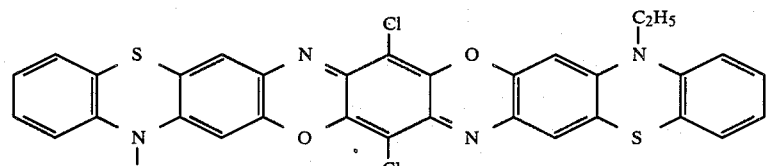 | 241 | 49 | bluish violet |
EXAMPLE 18
(a) If a mixture of 208 g of the compound

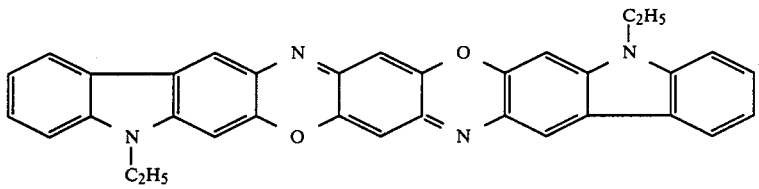

and 300 g of N-methylolchloroacetamide is added at 0°–5° C. to 1.1 liters of 90% strength sulphuric acid and the procedure followed is otherwise as in Example 1a, the result obtained is 351 g of the compound obtained in analogous manner is the corresponding compounds of the general formula

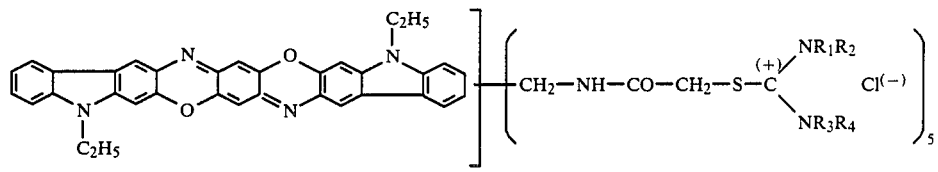

They have the same spectrum of properties as the above-mentioned compound.

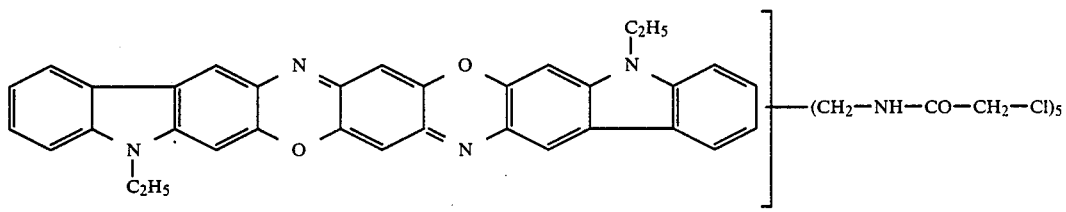

(b) If 42 g of this compound are reacted in a boiling mixture of 440 ml of water and 54 g of glacial acetic acid with 20 g of thiourea for 1 hour, the result obtained is a deep blue solution containing about 10% of the compound

EXAMPLE 19

(a) A mixture of 48 g of paraformaldehyde and 204 g of bromoacetamide is added at 0°–5° C. to 1.1 liters of 98% strength sulphuric acid. The mixture is stirred at

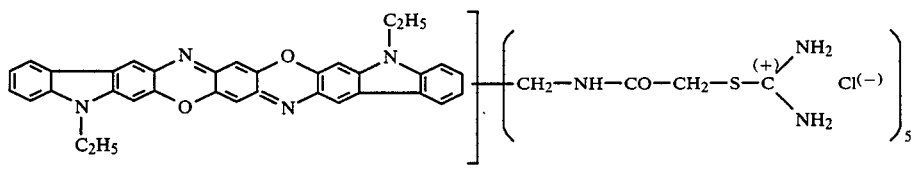

It corresponds to the compound of Example 1b in its hue and fastness properties. $\lambda_{max}$ in methanol 583 nm.

40° C. for 30 minutes and is cooled down again to 0°–5° C., and 236 g of the compound

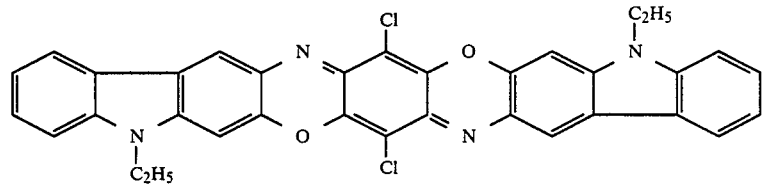

If 42 g of the compound of Example 18a are made to react with the thioureas of the formula (XXV) indicated in Table 1 in amount and substitution pattern, the result are added at this temperature. The mixture is stirred at room temperature for 15 hours and is worked up as in Example 1a to give 421 g of the following compound

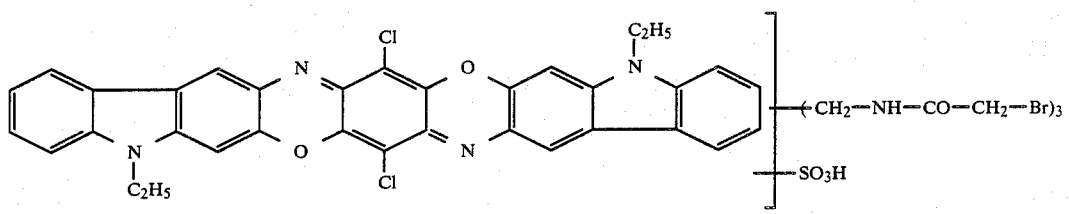

(b) If 55 g of this compound are reacted at 170° C. with 30 g of 2-mercaptobenzimidazole in 400 ml of nitrobenzene and the reaction mixture is allowed to cool down after 4 hours, the result obtained on filtering with suction and drying is 73 g of the compound

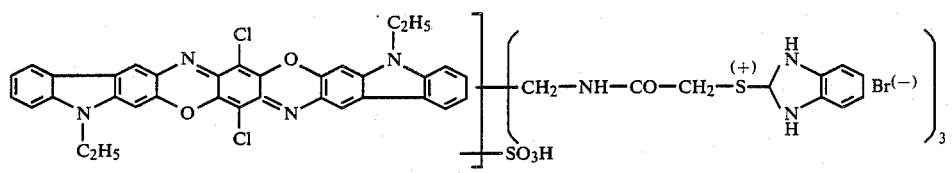

Dissolved in 5% strength lactic acid it produces bluish-violet dyeings which in the level of fastness properties correspond to the compound of Example 1b.

EXAMPLE 20

If 55 g of the compound of Example 19a are reacted with 46 g of N,N'-diphenylthiourea as in Example 19b, the result obtained is 83 g of the compound

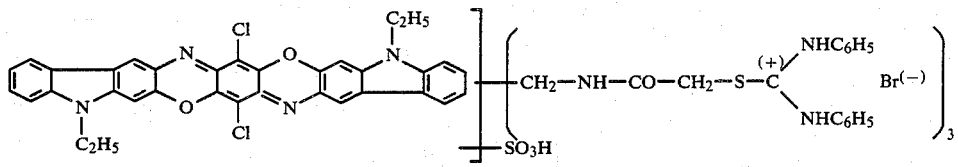

It resembles the forenamed compound in its properties.

EXAMPLE 20a

If 55 g of the compound of Example 19a are reacted at 140° C. with 27 g of N,N',N'',N'''-tetramethylthiourea in 400 ml of nitrobenzene, the result obtained analogously to Example 19b is 69 g of the compound

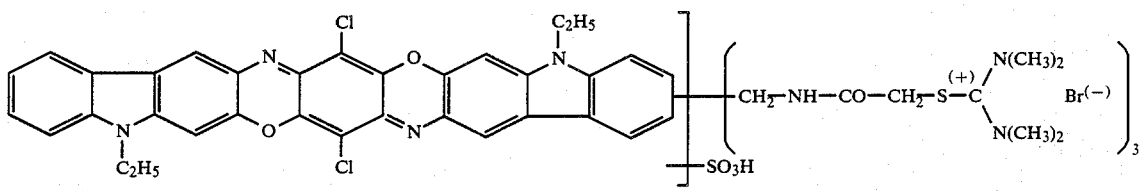

Dissolved in 10% strength acetic acid it produces blue dyeings which correspond in fastness level to the compound of Example 1b.

EXAMPLE 21

(a) 11.9 g (30.0 mmol) of the compound

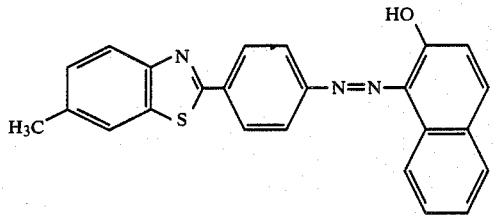

are added at 0°–5° C. in the form of a mixture with 14.3 g (116 mmol) of N-methylolchloroacetamide to 60 ml of 100% strength sulphuric acid. The mixture is stirred at 0°–5° C. for 2 hours, at room temperature overnight and finally at 40°–45° C. for 2 hours. The mixture is discharged onto 300 g of ice, and the precipitated product is filtered off with suction and is washed with water until sulphate-free and neutral. Drying at 60° C. leaves in quantitative yield 20.5 g of the compound

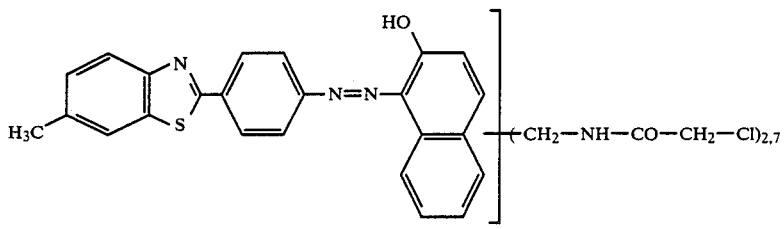

Cl: calculated 14.07%, found 14.1%.

(b) 6.8 g of the preceding compound (10.0 mmol) are maintained at 95°-100° C. together with 3.1 g of thiourea in a mixture of 70.2 ml of water and 8.9 g of glacial acetic acid for 1 hour. The result obtained is a red solution. Combined with very good exhaustion properties the result obtained on paper is red dyeings having good wetfastness properties. $_{max}$ (water/glacial acetic acid 2:1) 499 nm.

The following general reaction procedure, which corresponds to the preparative procedure of Example 21, can be used to prepare the compounds of Examples 22-167. The variables marked by * are tabulated.

GENERAL REACTION PROCEDURE (a) A mixture of 30 mmol of a dyestuff * with * g of N-methylolchloroacetamide is introduced at 0°-5° C. into * ml of *% strength sulphuric acid without lumping, and the mixture is stirred at 0°-5° C. for 2 hours. The mixture is then stirred 1st at *°C. overnight and finally if necessary 2nd at *°C. for * hours. When the reaction has ended, the mixture is discharged onto ice, and the product is filtered off with suction, washed until neutral and dried. This gives a product having n * —CH$_2$—NH—CO—CH$_2$—Cl radicals.

(b) 10 mmol of the above product are reacted at 95°-100° C. with 1.5 n mmol of thiourea by heating in dilute acetic acid for 1 hour. The result is a compound which can be used directly for dyeing. The hue of its dyeing on paper is tabulated. The reaction batches are to be chosen such that at 100% dyestuff yield the completed solution contains 10-15% of dyestuff and 10% of glacial acetic acid. In many cases the acetic acid content can be reduced to 5%, if desired even 1%. Contents of above 10% or the absence of acid generally give no advantages. Instead of acetic acid it is also possible to use other acids mentioned in the general part. It is frequently of advantage to use emulsifiers and/or other additives for increasing the stability of the solution.

If ethylenethiourea is used in place of thiourea, the products obtained are generally similar. In the latter case, however, there are instances when the wetfastness properties are even a little better. Instead of using thiourea it is also possible to use N-methylthiourea, N,N'-dimethylthiourea, N-alkylthiourea or N-phenylthiourea. The products thus obtained are substantially similar to the abovementioned ones.

| Example | Structure | MCA g | H$_2$SO$_4$ ml | % | Stirring 1st overnight | h | 2nd °C | n | Hue |
|---|---|---|---|---|---|---|---|---|---|
| 22 | H$_3$C-benzothiazole-C$_6$H$_4$-N=N-K, K= barbituric acid derivative | 4.5 | 60 | 100 | Rt | 0.5 | 100 | 1 | yellow |
| 23 | N-C$_6$H$_5$ barbiturate methyl | 8.8 | 60 | 100 | RT | 1 | 100 | 1.7 | yellow |
| 24 | N,N-dimethyl barbiturate methyl | 8.9 | 60 | 100 | RT | 3 | 45 | 2 | yellow |
| 25 | thiobarbituric acid methyl | 4.5 | 60 | 100 | RT | 2 | 70 | 1 | yellow |
| 26 | thiobarbiturate NH methyl | 4.5 | 60 | 100 | RT | 2 | 60 | 1 | yellow |
| 27 | N-C$_6$H$_5$ thiobarbiturate methyl | 9.0 | 60 | 100 | RT | 3 | 45 | 2 | yellow |

-continued

| | | | | | | | | | |
|---|---|---|---|---|---|---|---|---|---|
| 28 | ![structure with NH2, HN, N, O, O, methyl] | 4.5 | 60 | 100 | RT | 2 | 70 | 1 | yellow |
| 29 | ![structure with H2N, HN, N, NH2, S, methyl] | 4.5 | 60 | 100 | RT | 2 | 70 | 1 | yellow |
| 30 | ![structure with C6H5, N, NH, O, O, methyl] | 7.1 | 60 | 100 | RT | 2 | 60 | 1.5 | yellow |
| 31 | ![structure with H3C, HN, NH, O, O, acetyl, methyl] | 4.5 | 60 | 100 | RT | 2 | 60 | 1 | yellow |

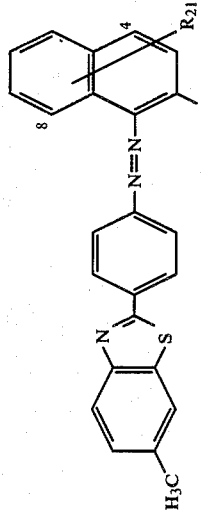
| Example | R21 | MCA g | H₂SO₄ ml | H₂SO₄ % | Stirring 1st overnight | Stirring 2nd h | Stirring 2nd °C | n | Hue |
|---|---|---|---|---|---|---|---|---|---|
| 32 | 4-Chloro | 9.5 | 60 | 100 | RT | 2 | 45 | 2 | red |
| 33 | 4-Bromo | 9.5 | 70 | 100 | RT | 2 | 45 | 2 | red |
| 34 | 4-Methyl | 14.3 | 60 | 100 | RT | 2 | 45 | 2.6 | red |
| 35 | 4-Ethyl | 14.3 | 60 | 100 | RT | 2 | 45 | 2.7 | red |
| 36 | 4-Methoxy | 14.3 | 60 | 100 | RT | 2 | 45 | 3 | red |
| 37 | 8-Methylamino | 12.0 | 60 | 100 | RT | 2 | 45 | 2.5 | red |
| 38 | 8-Anilino | 14.3 | 80 | 100 | RT | 2 | 45 | 3 | red |
| 39 | 8-Hydroxy | 14.3 | 60 | 100 | RT | 2 | 45 | 3 | red |

H₃C–[benzothiazole]–C₆H₄–N=N–CH(CO-NH-Ar)(CO-CH₃)

| Example | Ar = | MCA g | H₂SO₄ ml | H₂SO₄ % | Stirring 1st overnight | Stirring 2nd h | 2nd °C. | n | Hue |
|---|---|---|---|---|---|---|---|---|---|
| 40 | Phenyl | 9.3 | 110 | 96 | RT | 3 | 50 | 2 | yellow |
| 41 | o-Methoxy-phenyl | 8.4 | 90 | 90 | RT | 1 | 40 | 2 | yellow |
| 42 | o-Ethyl-phenyl | 8.4 | 90 | 90 | RT | 2 | 45 | 2 | yellow |
| 43 | 2,4-Dichloro-phenyl | 4.5 | 90 | 100 | RT | 0.5 | 90 | 1 | yellow |
| 44 | o-Cyano-phenyl | 9.5 | 90 | 100 | RT | 2 | 60 | 2 | yellow |
| 45 | o-Chloro-phenyl | 9.5 | 100 | 100 | RT | 2 | 60 | 2 | yellow |
| 46 | p-Chloro-phenyl | 4.5 | 100 | 100 | RT | 0.5 | 90 | 1 | yellow |
| 47 | p-Bromo-phenyl | 4.5 | 100 | 90 | RT | 0.5 | 90 | 1 | yellow |
| 48 | p-Tolyl | 8.4 | 90 | 90 | RT | 1 | 40 | 2 | yellow |
| 49 | m-Sulfamido-phenyl | 4.5 | 90 | 100 | RT | 0.1 | 90 | 1 | yellow |
| 50 | p-Nitro-phenyl | 4.5 | 110 | 100 | RT | 0.5 | 90 | 1 | yellow |
| 51 | p-Amino-phenyl | 4.5 | 80 | 100 | RT | 0.5 | 90 | 1 | yellow |

Structure:

H₃C-benzothiazole-phenyl-N=N-C(R₂₅)=N-N(Ar)-C(=Q₁)- (pyrazolone-type)

| Example | Q₁ | R₂₅ | Ar | MCA g | H₂SO₄ ml | H₂SO₄ % | Stirring 1st overnight | Stirring 2nd h | Stirring 2nd °C | n | Hue |
|---|---|---|---|---|---|---|---|---|---|---|---|
| 52 | O | CH₃ | Phenyl | 8.4 | 90 | 100 | RT | 2 | 45 | 2 | yellow |
| 53 | O | CH₃ | o-Cyano-phenyl | 9.2 | 90 | 100 | RT | 2 | 60 | 2 | yellow |
| 54 | O | CH₃ | o-Chloro-phenyl | 9.0 | 90 | 100 | RT | 2 | 60 | 2 | yellow |
| 55 | O | CH₃ | p-Bromo-phenyl | 4.5 | 90 | 100 | RT | 0.5 | 100 | 1 | yellow |
| 56 | O | CH₃ | o-Methoxy-phenyl | 8.4 | 90 | 100 | RT | 2 | 45 | 2 | yellow |
| 57 | O | CH₃ | p-Tolyl | 8.4 | 90 | 100 | RT | 2 | 45 | 2 | yellow |
| 58 | O | CH₃ | p-Nitro-phenyl | 4.5 | 90 | 100 | RT | 0.5 | 100 | 1 | yellow |
| 59 | O | CH₃ | m-Sulfamido-phenyl | 4.5 | 90 | 100 | RT | 0.5 | 100 | 1 | yellow |
| 60 | O | CH₃ | p-Sulfamido-phenyl | 4.5 | 90 | 100 | RT | 0.5 | 100 | 1 | yellow |
| 61 | O | CH₃ | p-Amino-phenyl | 4.5 | 90 | 100 | RT | 0.5 | 100 | 1 | yellow |
| 62 | O | CH₃ | 2,4-Dimethyl-phenyl | 8.4 | 90 | 100 | RT | 2 | 45 | 2 | yellow |
| 63 | O | COOCH₃ | Phenyl | 8.4 | 90 | 100 | RT | 2 | 45 | 2 | yellow |
| 64 | O | COOC₂H₅ | Phenyl | 8.4 | 90 | 100 | RT | 2 | 45 | 2 | yellow |
| 65 | O | CONH₂ | Phenyl | 8.4 | 90 | 100 | RT | 2 | 45 | 2 | yellow |
| 66 | O | NH₂ | Phenyl | 8.4 | 90 | 100 | RT | 2 | 45 | 2 | yellow |
| 67 | NH | CH₃ | Phenyl | 8.4 | 90 | 100 | RT | 2 | 45 | 2 | yellow |

| Example | D = | MCA g | H₂SO₄ ml | H₂SO₄ % | Stirring 1st | Stirring 1st h | Stirring 2nd °C. | n | Hue |
|---|---|---|---|---|---|---|---|---|---|
| 68 | ![structure with CH₃, N=N, phenyl, C=O] | 8.4 | 100 | 100 | overnight RT | 2 | 45 | 2 | yellow |
| 69 | benzothiazole with CH₃ groups | 8.4 | 100 | 100 | RT | — | — | 2 | golden yellow |
| 70 | p-tolyl-N=N-phenyl | 8.4 | 100 | 100 | RT | 1 | 45 | 2 | golden yellow |
| 71 | Cl, CH₃ tolyl-N=N-phenyl | 8.4 | 100 | 100 | RT | 1 | 45 | 2 | golden yellow |
| 72 | CH₃-tolyl-N=N-(o-tolyl) | 8.4 | 100 | 100 | RT | 1 | 45 | 2 | yellow |
| 73 | tolyl-N=N-benzotriazole | 9.5 | 100 | 100 | RT | 1 | 60 | 2 | golden yellow |

Example 73 structure: pyridone with OH, CN, N-CH₃, H₃C, C=O, N=N-phenyl-N=N-phenyl -continued

| No. | Structure | | | | | | | Color |
|---|---|---|---|---|---|---|---|---|
| 74 | (benzothiazole-phenyl-N=N-pyridone with COOCH₃, OH, N-C₆H₅, H₃C) | 8.4 | 100 | 100 | RT | 2 | 45 | 2 | golden yellow |
| 75 | (benzoxazole-phenyl-N=N-pyridone with CN, OH, NH, H₃C) | 4.5 | 100 | 100 | RT | 0.5 | 100 | 1 | golden yellow |
| 76 | (benzothiazole-phenyl-N=N-pyridone with H₃COOC, OH, N-(CH₂)₃N(CH₃)₂) | 4.5 | 100 | 100 | RT | 0.5 | 100 | 1 | golden yellow |
| 77 | (N-methylbenzimidazole-phenyl-N=N-pyridone with CONH₂, OH, NH, H₃C) | 4.5 | 100 | 100 | RT | 0.5 | 100 | 1 | golden yellow |
| 78 | (benzimidazole-phenyl-N=N-phenyl-N(CH₂C₆H₅)(CH₃)) | 14.5 | 100 | 100 | RT | 2 | 45 | 3 | golden yellow |
| 79 | (methylbenzothiazole-phenyl-N=N-phenyl-N(CH₂C₆H₅)(CH₃)) | 9.0 | 70 | 100 | RT | 2 | 45 | 2 | golden yellow |

-continued

| No. | Structure | | | | | | | Color |
|---|---|---|---|---|---|---|---|---|
| 80 | (benzothiazole-benzothiazole-phenyl-N=N-CH(CO-NH-CO-NH)) | 9.0 | 80 | 100 | RT | 0.5 | 100 | 2 | orange |
| 81 | (methylbenzothiazole-phenyl-N=N-phenyl-benzothiazole-CH₃) | 11.2 | 120 | 100 | RT | 4 | 45 | 2 | yellow |
| 82 | (methylbenzothiazole-phenyl-N=N-naphthol-CONHAr) | 12.0 | 100 | 96 | RT | — | — | 3 | bluish red |
| 83 | Ar = Phenyl | 12.0 | 100 | 96 | RT | — | — | 3 | bluish red |
| 84 | Ar = p-Methoxyphenyl | 12.0 | 100 | 96 | RT | — | — | 3 | bluish red |
| 85 | Ar = o-Methoxyphenyl / 1-Naphthyl | 11.3 | 100 | 96 | RT | — | — | 3 | bluish red |

| Example | D(̵N=N—K)₂ | MCA g | H₂SO₄ ml | H₂SO₄ % | Stirring 1st overnight | Stirring 1st h | Stirring 2nd h | Stirring 2nd °C. | n | Hue |
|---|---|---|---|---|---|---|---|---|---|---|
| 86 | D = —⟨C₆H₄⟩—, K = —NH—CO—NH—⟨C₆H₄⟩—CH₃; K = CH₃—CO—CH—CO—NH—C₆H₅ | 16.0 | 150 | 90 | RT | — | — | — | 4 | yellow |
| 87 | ![structure with OCH₃]; CH₃—CO—CH—CO—NH— | 16.0 | 150 | 90 | 0–5 | — | — | — | 4 | yellow |
| 88 | β-Naphthol | 16.0 | 80 | 96 | RT | — | — | — | 3,5 | bluish red |
| 89 | D = —⟨C₆H₄⟩—NH—⟨C₆H₄⟩—CH₃; K = β-Naphthol | 16.0 | 80 | 96 | RT | — | — | — | 4 | bluish red |
| 90 | K = naphthol with CO—NH— and OH | 16.0 | 100 | 96 | RT | — | — | — | 4 | blue |
| 91 | naphthol with OH and CO—NH—C₆H₅ | 16.0 | 100 | 96 | RT | — | — | — | 4 | blue |

| | | | | | | | |
|---|---|---|---|---|---|---|---|
| 92 |  | 16.0 | 100 | 96 | RT | — | 3,2 | red |
| 93 |  | 16.0 | 80 | 96 | RT | — | 3,7 | orange |
| 94 |  | 16.0 | 100 | 96 | RT | — | 4 | red |
| 95 |  | 16.0 | 100 | 96 | RT | — | 4 | orange-red |
| 96 |  | 16.0 | 80 | 96 | RT | — | 4 | golden yellow |

-continued

| No. | Structure | | | | | | | Color |
|---|---|---|---|---|---|---|---|---|
| 97 | ![structure: CH3, OH, N-CH3, pyridone-like] | 8.0 | 80 | 100 | RT | 2 | 45 | 2 | yellow |
| 98 | D= ⟨C6H4⟩–CO–NH–⟨C6H4-CH3⟩; K = β-Naphthol | 16.0 | 80 | 96 | RT | — | — | 3,5 | red |
| 99 | naphthyl–CO–NH–/ OH-naphthalene | 16.0 | 100 | 96 | RT | — | — | 4 | bluish red |
| 100 | phenyl–CO–NH–/ OH-naphthalene | 16.0 | 100 | 80 | RT | — | — | 4 | bluish red |
| 101 | CH3–C(=N–NHPh)–... pyrazolone type | 16.0 | 80 | 96 | RT | — | — | 4 | golden yellow |
| 102 | K = CH3–CO–CH(–)–CO–NH–C6H5 | 16.0 | 80 | 90 | 0–5 | — | — | 4 | yellow |

-continued

| | | | | | | | | |
|---|---|---|---|---|---|---|---|---|
| 103 | CH₃—CO—CH—CO—NH—[2-methoxyphenyl] | 16.0 | 80 | 90 | 0-5 | — | 4 | yellow |
| 104 | D = H₃CO—[3-methylphenyl]—CO—NH—[phenyl]—NH—CO—[3-methyl-4-methoxyphenyl]; K = β-Naphthol | 16.0 | 100 | 96 | RT | — | 4 | red |
| 105 | D = [tolyl]—S—S—[phenyl]; K = 1-methyl-3-(2-ethoxyphenylcarbamoyl)-2-naphthol | 16.0 | 100 | 96 | RT | — | 4 | bluish red |
| 106 | CH₃—CO—CH—CO—NH—[2-methoxyphenyl] | 16.0 | 80 | 90 | 0-5 | — | 4 | golden yellow |
| 107 | D = [tolyl]-benzotriazolyl; K = β-Naphthol | 16.0 | 80 | 96 | RT | — | 2 | red |
| 108 | D = [tolyl]—NH—CO—[3-methylphenyl] | 16.0 | 100 | 96 | RT | — | 4 | bluish red |

| | | | | | | | |
|---|---|---|---|---|---|---|---|
| 109 | 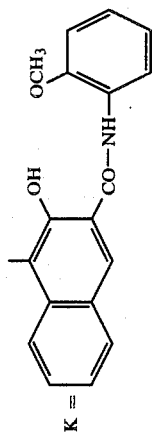 | 16.0 | 120 | 90 | RT | — | 4 | yellow |
| 110 | 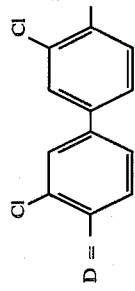 | 8.0 | 120 | 90 | RT | — | 2 | yellow |
| 111 | 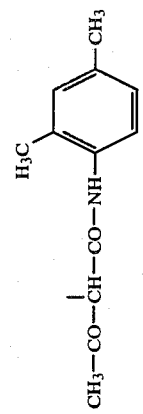 | 16.0 | 100 | 96 | RT | — | 4 | orange |
| 112 | 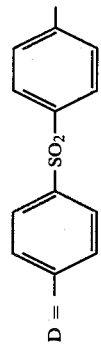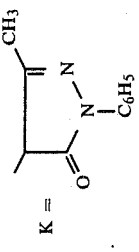 | 16.0 | 100 | 100 | RT | — | 4 | golden yellow |

-continued

| | D= / K= | | | | | | | Color |
|---|---|---|---|---|---|---|---|---|
| 113 | D= (4-methyl-2-methylphenyl)-N=N-(phenyl); K = β-Naphthol | 16.0 | 100 | 100 | RT | 1 | 45 | 4 | violet |
| 114 | D= 4-methoxy-3-methylphenyl-SO₂-(4-methoxyphenyl); K = β-Naphthol | 16.0 | 80 | 96 | RT | 2 | 45 | 4 | orange |
| 115 | D= 3-(2-methylphenyl-NH-CO)-4-methyl-2-hydroxynaphthyl | 16.0 | 100 | 96 | RT | — | — | 4 | red |
| 116 | D= triazine with bis(4-methylphenyl-NH) and piperazinyl-(CH₂)₂-NH₂; K = CH₃—CO—CH—CO—NH—(2-methoxyphenyl) | 16.0 | 100 | 90 | 0–5 | — | — | 4 | yellow |

| | | | | | | | | |
|---|---|---|---|---|---|---|---|---|
| 117 | 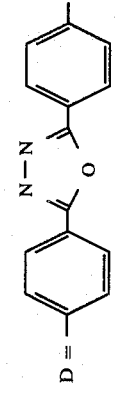 D = ![] N=N ![] K = β-Naphthol | 16.0 | 80 | 100 | RT | 2 | 45 | 4 | red |
| 118 | 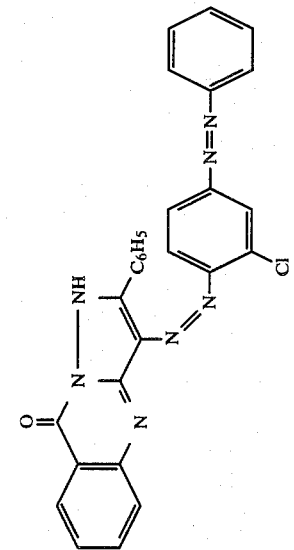 | 8.4 | 100 | 100 | RT | 2 | 45 | 2 | red |
| 119 | 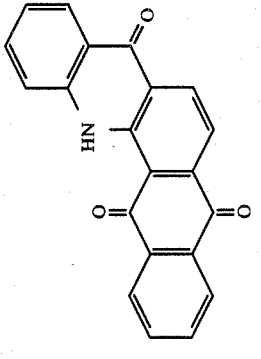 | 8.4 | 100 | 100 | RT | 2 | 60 | 2 | orange-red |
| 120 | 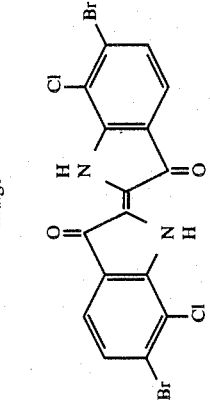 Indigo | 8.2 | 100 | 100 | RT | 2 | 60 | 2 | blue |
| 121 | | 8.2 | 100 | 100 | RT | 2 | 60 | 2 | blue |
| 122 |  Thioindigo | 8.2 | 100 | 100 | RT | 2 | 60 | 2 | violet |

-continued

| | | | | | | | | |
|---|---|---|---|---|---|---|---|---|
| 123 | [perylene bisimide structure, R = CH₃] | 8.0 | 80 | 96 | RT | — | — | 2 | red |
| 124 | [–OCH₃ phenyl] | 15.0 | 80 | 90 | RT | — | — | 3,5 | red |
| 125 | [–CH₃ phenyl] | 15.0 | 80 | 90 | RT | — | — | 3,5 | red |
| 126 | Indanthrone | 8.0 | 80 | 100 | RT | 2 | 45 | 2 | blue |
| 127 | Violanthrone | 8.0 | 80 | 100 | RT | 2 | 45 | 2 | blue |
| 128 | Isoviolanthrone | 8.0 | 80 | 100 | RT | 2 | 45 | 2 | violet |
| 129 | [structure, R = CH₃, RR = (CH₂)₂] | 8.0 | 80 | 100 | RT | 2 | 45 | 2 | blue |
| 130 | [benzimidazole naphthalimide structure] | 8.0 | 80 | 100 | RT | 2 | 45 | 2 | blue |
| 131 | | 8.0 | 80 | 100 | RT | 2 | 45 | 2 | orange |

-continued
| | | | | | | | |
|---|---|---|---|---|---|---|---|
| 132 | 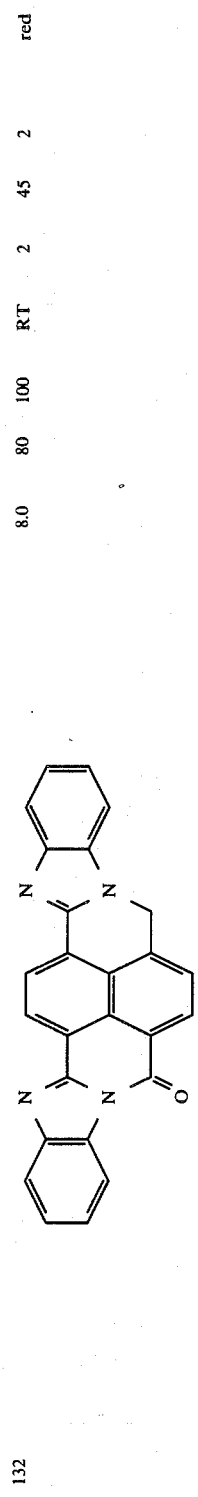 | 8.0 | 80 | 100 | RT | 2 | 45 | 2 | red |
| 133 | 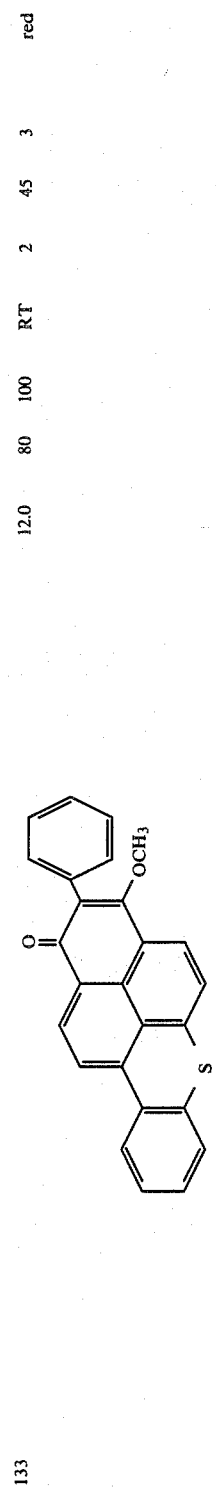 | 12.0 | 80 | 100 | RT | 2 | 45 | 3 | red |
| 134 | 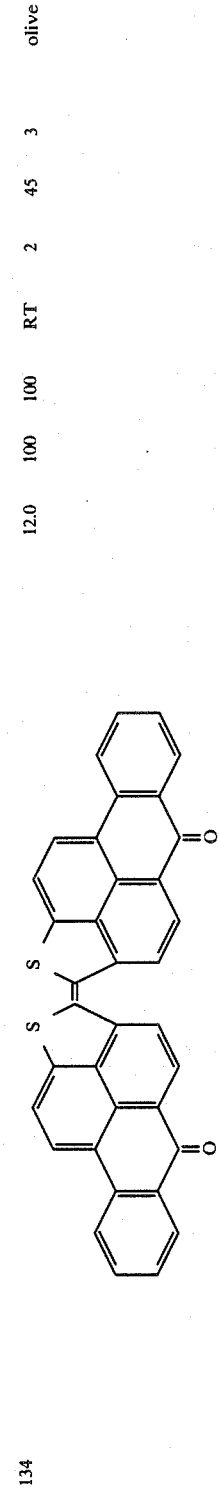 | 12.0 | 100 | 100 | RT | 2 | 45 | 3 | olive |
| 135 | 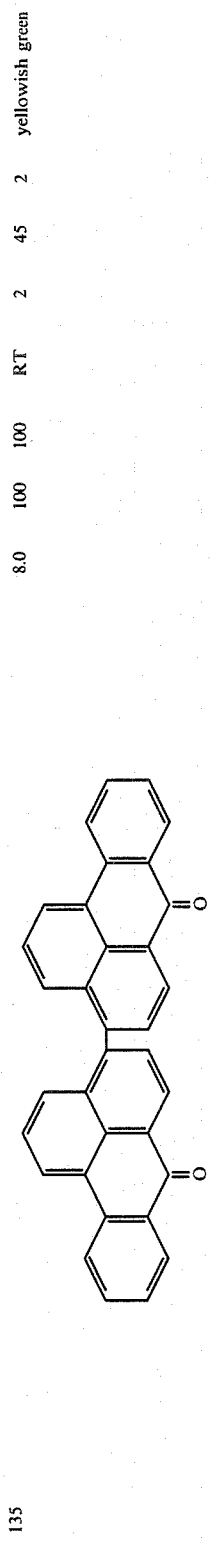 | 8.0 | 100 | 100 | RT | 2 | 45 | 2 | yellowish green |

-continued

| | | | | | | | | |
|---|---|---|---|---|---|---|---|---|
| 136 | [structure] | 8.0 | 100 | 100 | RT | 2 | 45 | 2 | olive |
| 137 | [structure] | 12.2 | 120 | 100 | RT | 2 | 60 | 3 | olive |
| 138 | [structure] | 8.0 | 100 | 100 | RT | 2 | 45 | 2 | yellow |

-continued

| | | | | | | | |
|---|---|---|---|---|---|---|---|
| 139 | [structure] | 8.0 | 80 | 100 | RT | — | 2 | red |
| 140 | [structure] | 8.6 | 80 | 85 | RT | — | 2 | reddish violet |
| 141 | [structure] | 8.3 | 80 | 90 | RT | — | 2 | reddish violet |
| 142 | [structure] | 8.3 | 80 | 90 | RT | — | 2 | red |

-continued

| | | | | | | | | |
|---|---|---|---|---|---|---|---|---|
| 143 | [structure] | 8.2 | 40 | 100 | RT | — | — | 2 | yellow |
| 144 | [structure] | 4.0 | 60 | 100 | RT | 2 | 60 | 1 | yellow |
| 145 | [structure] | 4.0 | 60 | 100 | RT | 2 | 60 | 1 | yellow |
| 146 | [structure] | 8.0 | 60 | 100 | RT | — | — | 1 | yellow |
| 147 | [structure] | 4.4 | 70 | 100 | 0-5 | — | — | 1 | red |

-continued

| No. | Structure | | | | | | Color |
|---|---|---|---|---|---|---|---|
| 148 | (1,4-bis(p-tolylamino)anthraquinone) | 8.3 | 70 | 100 | 0–5 | — | 2 | bluish green |
| 149 | (dichloro-bis(o-tolyloxy-phenylimino)quinone) | 8.3 | 90 | 90 | 0–5 | — | 2 | bluish red |
| 150 | (bis(phenylcarbamoyl-cyanomethylene)-dihydroindole) | 12.0 | 70 | 100 | RT | 2 | 45 | 2.5 | yellow |

| No. | Ar | | | | | | Color |
|---|---|---|---|---|---|---|---|
| 151 | Phenyl | 15.7 | 150 | 100 | RT | — | — | 4 | blue |
| 152 | p-Tolyl | 12.4 | 130 | 100 | RT | — | — | 3 | blue |
| 153 | m-Tolyl | 12.4 | 130 | 100 | RT | — | — | 3 | blue |
| 154 | p-Anisyl | 15.7 | 150 | 100 | RT | — | — | 4 | blue |
| 155 | o-Anisyl | 15.7 | 150 | 100 | RT | — | — | 4 | blue |
| 156 | p-Phenethyl | 15.7 | 150 | 100 | RT | — | — | 4 | blue |
| 157 | p-Chlorophenyl | 12.5 | 150 | 100 | RT | 3 | 70 | 3 | blue |
| 158 | 1-Naphthyl | 15.7 | 150 | 100 | RT | — | — | 4 | blue |

-continued

| No. | Structure | | | | | | | Color |
|---|---|---|---|---|---|---|---|---|
| 159 | (structure: 2-(p-tolyl)-6-methylbenzothiazole) | 12.5 | 150 | 100 | RT | 3 | 70 | 3 | blue |
| 160 | (triarylmethane cation with p-ethoxyanilino, p-methoxyanilino, N-methylindole, Cl⁻) | 12.5 | 150 | 100 | RT | — | — | 3 | blue |
| 161 | (bis(4-(N-ethyl-N-benzylamino)phenyl)phenylmethyl cation, Cl⁻) | 8.0 | 100 | 100 | RT | — | — | 2 | green |
| 162 | (bis(4-(N-ethyl-N-benzylamino)phenyl)(2-chlorophenyl)methyl cation, Cl⁻) | 8.0 | 100 | 100 | RT | — | — | 2 | green |
| 163 | (bis(4-(N-ethyl-N-benzylamino)phenyl)(4-(N,N-diethylamino)phenyl)methyl cation, Cl⁻) | 8.0 | 100 | 100 | RT | — | — | 2 | violet |
| 164 | (bis(4-(N-ethyl-N-benzylamino)phenyl)(4-(4-ethoxyanilino)phenyl)methyl cation, Cl⁻) | 12.0 | 150 | 100 | RT | — | — | 3 | blue |

-continued
| | | | | | | | |
|---|---|---|---|---|---|---|---|
| 165 | 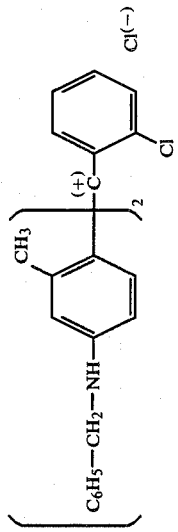 | 8.0 | 100 | 100 | RT | — | — | 2 | greeny blue |
| 166 | 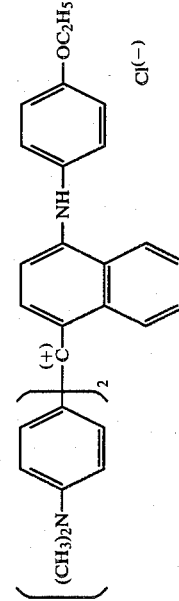 | 8.0 | 100 | 100 | RT | — | — | 2 | blue |
| 167 | 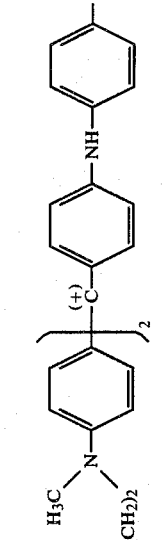 | 8.0 | 100 | 100 | RT | — | — | 2 | blue |
| 168 | 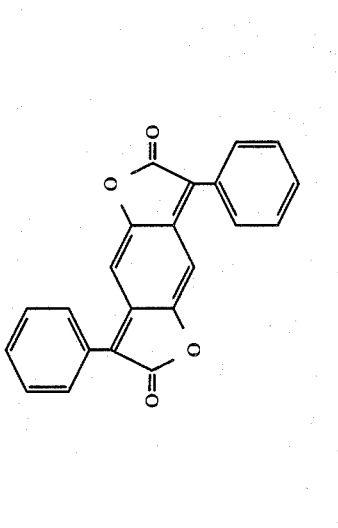 | 8.2 | 60 | 100 | RT | 2 | 40 | 2 | orange |

-continued
| 169 | 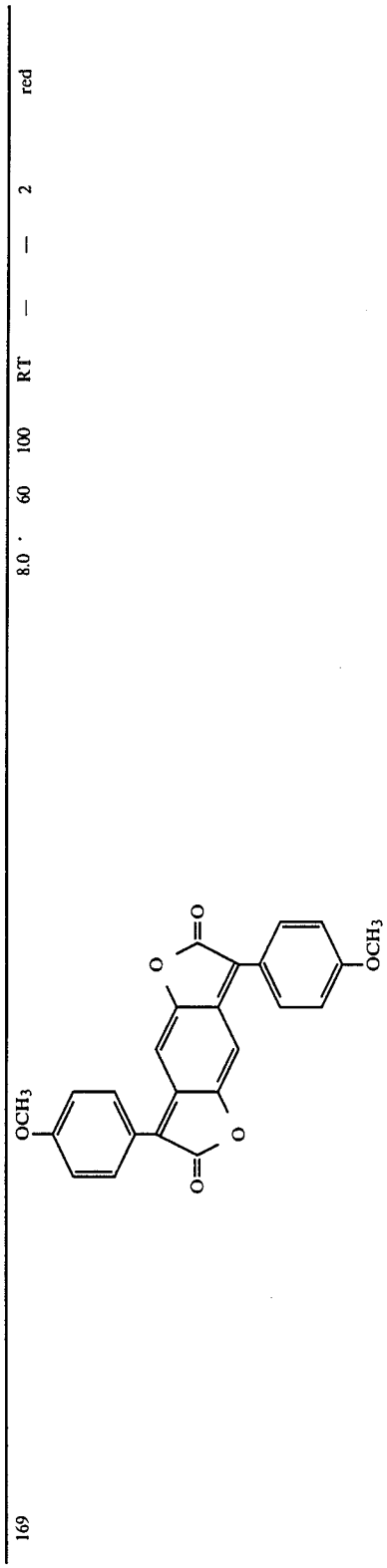 | 8.0 | 60 | 100 | RT | — | 2 | red |

EXAMPLE 170

(a) 61.0 g of 95% pure copper phthalocyanine are added at 100° C. to 800 g of polyphosphoric acid. 18.0 g of N-methylolchloroacetamide (MCA) are added, and the temperature is raised to 125°-130° C. A further 60.0 g of MCA are then added in portions of 10.0 g every 15 minutes, and the mixture is stirred at 125°-130° C. for hours. The reaction batch is then stirred into 2.1 liters of water at 50° C. After cooling down to 40° C. by stirring the mixture is filtered with suction, and the filter cake is washed with water until neutral and dried at 60° C. This gives 100.5 g of the compound

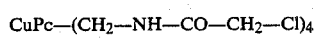

(b) 20.0 g of the above compound in 250 ml of 15% strength acetic acid are treated with 20.6 g of N-methyl-N,N'-trimethylenethiourea, and the mixture is maintained at 90°-95° C. for 2 hours. 120 ml of glacial acetic acid are then added and the solution is stirred until cold. It dyes paper in a turquoise colour and contains the compound

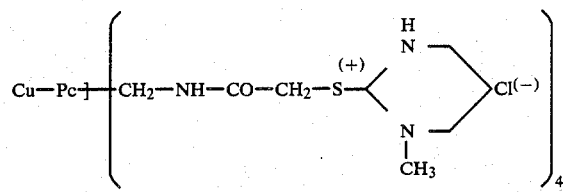

$\lambda_{max}$ (water/glacial acetic acid 2:1) 603 nm.

EXAMPLE 171

If the compound of Example 170(a) is reacted with 16.0 g of ethylenethiourea in place of N,N'-trimethylenethiourea and if otherwise the procedure of Example 170(b) is followed, this gives a solution of the compound

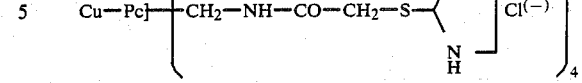

which resembles the above in its properties.

EXAMPLE 172

If copper phthalocyanine is replaced by the corresponding nickel compound and if otherwise the procedures of Example 170(a) and 171 are followed, this gives a solution of the compound

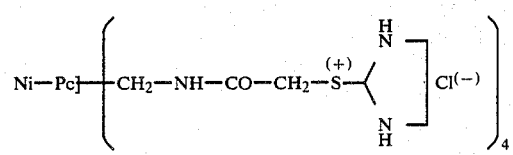

Hue on paper bluish-green.

EXAMPLE 173

(a) 50.0 g of dehydrothiotoluidine and 31.0 g of N-methylolchloroacetamide are added at 0°-5° C. in the form of a mixture of 300 ml of monohydrate. The mixture is stirred at this temperature for a further 2 hours, at room temperature overnight and finally at 100° C. for 1 hour. Cooling down to 30° C. is followed by discharge onto 2 kg of ice, filtering with suction, washing until neutral and drying. This gives the compound

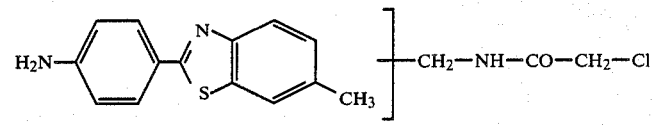

(b) If this compound is diazotised in a conventional manner and coupled onto barbituric acid, the result obtained is

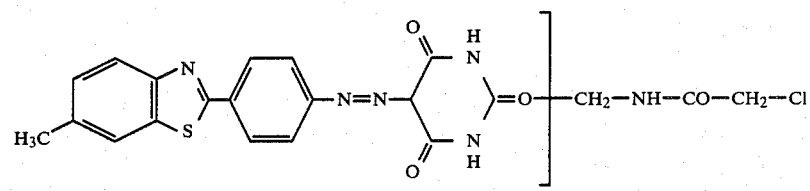

(c) Reaction of this compound with thiourea in accordance with the general reaction method part b leads to a compound

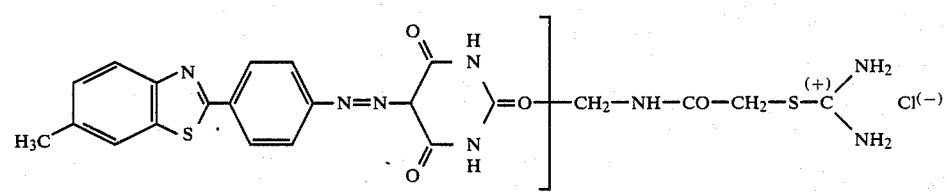

which corresponds to that of Example 22 in all properties.

EXAMPLE 174

On diazotising the compound of Example 173(a), coupling onto cyaniminobarbituric acid and reacting with ethylenethiourea in accordance with the general reaction method part b the result obtained is

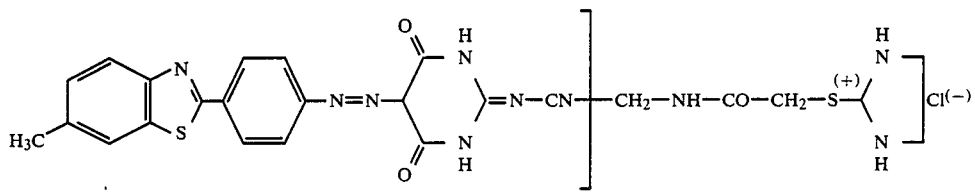

The solution dyes paper yellow.

What is claimed is:

1. A dyestuff of the formula

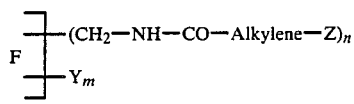

(I)

in which

F is an azine, phthalocyanine or quinophthalone chromophore,

Z is a radical of the formula

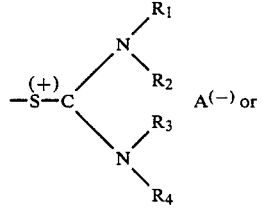

$R_1$–$R_4$ each is hydrogen, alkyl, cycloalkyl, alkenyl, aryl, aralkyl or a heterocyclic structure or $R_2$ and $R_3$ are an optionally substituted amino group or together form a ring or $R_1$ with $R_2$ and/or $R_3$ with $R_4$ form a ring, $A^{(-)}$ is an anion, Y is an anionic group, m is 0–2 and n is 1–6, and wherein the chromophore and said radicals can carry further substituents provided that the total number of anionic substituents is smaller than the total number of quaternary and quaternizable amino groups.

2. A dyestuff according to claim 1, in which Z is a radical of the formula

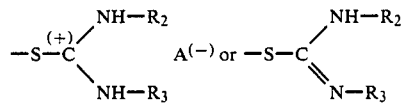

$R_2$ and $R_3$ each is hydrogen, $C_1$–$C_4$—alkyl, $C_2$–$C_4$—alkenyl, cyclohexyl, phenyl or tolyl or $R_2$ and $R_3$ together are ethylene, trimethylene, vinylene or o-phenylene, Y is a sulpho or sulphonate group.

m is 0–1 and n is 1–5, and the number of sulpho groups is smaller than the number of quaternary and quaternizable amino groups.

3. A dyestuff according to claim 1 of the formula

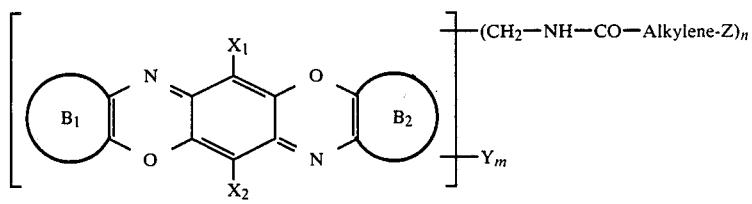

in which $X_1$ and $X_2$ independently of each other denote hydrogen, halogen, alkyl, cycloalkyl, aryl, alkoxy, aryloxy, CN, $CONH_2$, CONH—alkyl, $CON(alkyl)_2$, CONH—aryl, COO—alkyl, NH—CO—alkyl, NH—aryl, NH—CO—aryl or NH—CO—heteroaryl and $B_1$ and $B_2$ independently of each other denote a benzene ring or a fused-on ring system having 2 to 4 carbocyclic and/or heterocyclic rings, and the cyclic and acyclic radicals and the rings $B_1$ and $B_2$ can carry further substituents, with the proviso that the total number of anionic substituents is smaller than the total number of quaternary and quaternizable amino groups.

4. A dyestuff according to claim 1 of the formula

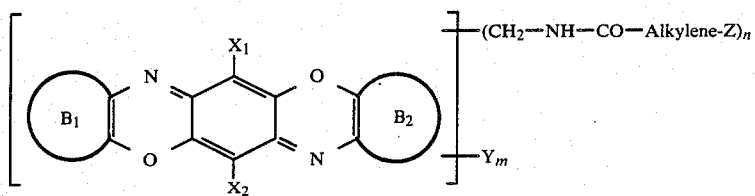
wherein
$X_1$ and $X_2$ independently of each other denote hydrogen or halogen,
$B_1$ and $B_2$ independently of each other denote a group from the series benzene, naphthalene, fluorene, phenothiazine, diphenylene sulphide, phenanthrene, anthracene, fluorenone, carbazole or anthraquinone, and
$n$ denotes 2–5.